（12）United States Patent
Ueki et al.

(10) Patent No.: US 10,393,334 B2
(45) Date of Patent: Aug. 27, 2019

(54) DAYLIGHTING MEMBER, DAYLIGHTING DEVICE, AND INSTALLATION METHOD FOR DAYLIGHTING MEMBER

(71) Applicant: SHARP KABUSHIKI KAISHA, Sakai, Osaka (JP)

(72) Inventors: Tomoko Ueki, Sakai (JP); Hideomi Yui, Sakai (JP); Shun Ueki, Sakai (JP); Tsuyoshi Kamada, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/749,716

(22) PCT Filed: Aug. 3, 2016

(86) PCT No.: PCT/JP2016/072790
§ 371 (c)(1),
(2) Date: Feb. 1, 2018

(87) PCT Pub. No.: WO2017/022792
PCT Pub. Date: Feb. 9, 2017

(65) Prior Publication Data
US 2018/0231203 A1  Aug. 16, 2018

(30) Foreign Application Priority Data
Aug. 4, 2015  (JP) ................ 2015-154362

(51) Int. Cl.
*F21S 11/00* (2006.01)
*G02B 5/04* (2006.01)
(Continued)

(52) U.S. Cl.
CPC .............. *F21S 11/007* (2013.01); *E06B 5/00* (2013.01); *E06B 9/24* (2013.01); *F21S 11/00* (2013.01);
(Continued)

(58) Field of Classification Search
CPC .................................................. F21S 11/007
See application file for complete search history.

(56) References Cited

U.S. PATENT DOCUMENTS 9,970,613 B2 *  5/2018  Yui ..................... G02B 5/0215
2011/0043919 A1  2/2011  Ko et al.
(Continued)

FOREIGN PATENT DOCUMENTS

CN  201896571 U  7/2011
CN  202177719 U  3/2012
(Continued)

*Primary Examiner* — Christopher E Mahoney
(74) *Attorney, Agent, or Firm* — ScienBiziP, P.C.

(57) ABSTRACT

A daylighting film (1) according to an aspect of the invention includes a first base (2), a plurality of daylighting portions (3) constituted by a plurality of polygonal prism structures, and gaps (9) provided between the plurality of daylighting portions (3). Each of the daylighting portions (3) is a polygon that has four vertexes in a sectional shape orthogonal to a longitudinal direction and has all interior angles less than 180°, and has a first side that is a side of the polygon corresponding to a surface in contact with the first base (2) and a plurality of vertexes including a first vertex and a second vertex that are vertexes corresponding to both ends of the first side, and a third vertex that is not positioned on the first side. A length of a line perpendicular to the first side passing the third vertex is longer than lengths of lines perpendicular to the first side passing vertexes other than the third vertex among the plurality of vertexes, and a shape of the daylighting portion 3 is asymmetrical with the line perpendicular to the first side passing the third vertex as a center.

8 Claims, 28 Drawing Sheets

(51) Int. Cl.
  *E06B 5/00*   (2006.01)
  *F21V 5/02*   (2006.01)
  *G02B 5/00*   (2006.01)
  *E06B 9/24*   (2006.01)
  *G02B 5/02*   (2006.01)

(52) U.S. Cl.
  CPC ............... *F21V 5/02* (2013.01); *G02B 5/00* (2013.01); *G02B 5/0273* (2013.01); *G02B 5/04* (2013.01); *E06B 2009/2417* (2013.01)

(56) References Cited

U.S. PATENT DOCUMENTS

| | | |
|---|---|---|
| 2013/0038928 A1 | 2/2013 | Padiyath et al. |
| 2016/0223155 A1 | 8/2016 | Nango et al. |

FOREIGN PATENT DOCUMENTS

| | | | |
|---|---|---|---|
| JP | 2005049857 A | * | 2/2005 |
| JP | 5123364 B2 | | 1/2013 |
| JP | 2013-514549 A | | 4/2013 |
| WO | 97/31276 A1 | | 8/1997 |
| WO | 2015/046336 A1 | | 4/2015 |
| WO | 2015/076245 A1 | | 5/2015 |
| WO | 2015/098940 A1 | | 7/2015 |

\* cited by examiner

US 10,393,334 B2

DAYLIGHTING MEMBER, DAYLIGHTING DEVICE, AND INSTALLATION METHOD FOR DAYLIGHTING MEMBER

TECHNICAL FIELD

Some aspects of the present invention relate to a daylighting member, a daylighting device, and an installation method for the daylighting member.

This application claims priority based on Japanese Patent Application No. 2015-154362 filed in Japan on Aug. 4, 2015, the content of which is incorporated herein.

BACKGROUND ART

PTL 1 and PTL 2 propose a daylighting member that guides sunlight into a room through a window or the like of a building. In such a daylighting member, a plurality of unit prisms and a flat surface are formed on one surface of a light-transmissive support. The sunlight is guided into the room through the unit prisms.

CITATION LIST

Patent Literature

PTL 1: Japanese Patent No. 5123364
PTL 2: Japanese Unexamined Patent Application Publication (Translation of PCT Application) No. 2013-514549

SUMMARY OF INVENTION

Technical Problem

However, in configurations of PTL 1 and PTL 2, each of the unit prisms has a shape with a curved surface. In a case where the unit prism has a shape with a curved surface, light incident on the unit prism may be output in various directions depending on incident positions. That is, light that has been transmitted through a daylighting film may reach a position of eyes of a person in the room. Such light may cause glare and the person in the room may feel uncomfortable.

With a daylighting film of the related art, an area deep inside the room is difficult to be illuminated with light that is directed toward a ceiling in the room. That is, it is difficult to illuminate the room over a wide range with light reflected by ceiling. With the daylighting film of the related art, a region of the ceiling close to a window glass is intensively illuminated and a large difference occurs in illuminance distribution of the ceiling. Accordingly, a person may be dazzled in an area close to the window inside the room and feel dark in an area deep inside the room. In this case, a bright environment is maintained by using lighting equipment not only at night, but also in the daytime, and natural light (sunlight) is difficult to be sufficiently used.

Further, there is a problem that, in particular, when altitude of the sun is low in positional change of the sun caused by diurnal motion and annual motion of the sun, a sufficient daylighting effect is not achieved and glare is caused, and thus a person in the room is dazzled.

Importance of daylighting performance when the altitude of the sun is low will be described below.

For example, in a middle latitude region, when a direction of a window surface is shifted from the due south, the window surface is likely to be illuminated with light from the sun at a low altitude (30° or less). FIGS. 29 and 30 illustrate trajectories of the sun in Tokyo (latitude 35° north) in the middle latitude region, in which (1) indicates the trajectory at the winter solstice, (2) indicates the trajectory at the spring or fall equinox, and (3) indicates the trajectory at summer solstice. FIG. 29 illustrates the sky as a half sphere in Tokyo. FIG. 30 is a plan view of the half sphere of FIG. 29 when viewed from the zenith. A dotted line T of FIG. 30 indicates a position where the altitude of the sun is 30°. FIGS. 31A to 31C illustrate a range in which the altitude of the sun on a front side annually changes in each direction of a window surface of a window M on which a daylighting film is installed. The direction of the window surface is the south in FIG. 31A, the southwest in FIG. 31B, and the west in FIG. 31C. While the range in which the altitude of the sun changes is 31° or more in FIG. 31A, the range is 15° or more in FIG. 31B and 0° or more in FIG. 31C. Similarly, not only on a west side but also on an east side, the window surface which faces the direction other than the due south is illuminated with light from the sun positioned at a low altitude. FIGS. 32A to 32C are graphs each illustrating an amount of time relative to the altitude of the sun in each direction.

FIG. 32A indicates the due south, FIG. 32B indicates the southwest, and FIG. 32C indicates the west. According to the graphs, it is found that the amount of time during which the window surface is illuminated with light from the sun positioned at a low altitude is greater when the window surface faces the southwest compared to the case of facing the due south. Thus, when light rays of the sun at a low altitude is taken and used as indoor illumination, there is a great contribution to a power saving effect.

The light is more likely to be radiated from the sun at a low altitude in a high latitude region, in addition to the middle latitude region. FIG. 33 illustrates a trajectories (a plan view when viewed from the zenith) of the sun in Paris and London (latitude 50° north) in the high latitude region. It is found from FIG. 33 that a range in which the altitude of the sun annually changes is 10° or more when the direction of the window surface is the due south. The window surface in any direction is illuminated by the sun positioned at a low altitude. FIG. 34 illustrates time distribution of the altitude of the sun in a region at the latitude of 50°.

A graph indicates times integrated through a year for each altitude regardless of the azimuth of the sun. It is found from FIG. 34 that the sun exists at a low altitude for a longer time in a high latitude region and daylighting performance of light rays thereof is much more important than in a middle latitude region.

However, light rays from the sun at a low altitude cause glare and the person in the room is easily dazzled. There are two main factors therefor.

The first factor is that illuminance on the window surface depends on the altitude of the sun. On the window surface installed perpendicularly to the ground, illuminance of the sunlight on the window surface is proportional to a cosine of an angle formed by a direct light ray of the sun and a line normal to the window surface. That is, the illuminance on the window surface is high at the position of a low altitude (because a value of the cosine is large). Further, a light-transmissive substrate such as a glass or acrylic plate is separately installed on an outdoor side (an incident side of the sunlight) with respect to the daylighting film in many cases, and a light transmittance of the substrate also high because the angle formed with the line normal to the window surface is smaller when the altitude of the sun is low. As a result, the light rays of the sun at a low altitude irradiate the window surface with high illuminance. Regarding the properties of the daylighting film, in a case where even a few percent of light among the light rays irradiating the window surface is transmitted through the daylighting film to a position of a line of sight of the person in the room, glare is caused.

The second factor is an effect of eaves or a roof installed on a building. With respect to a daylighting film that is installed to extend from a ceiling to a certain height as illustrated in FIGS. 35A and 35B, most of the light rays from the sun at a high altitude are blocked by eaves or a roof and only a part of the daylighting film is illuminated as illustrated in FIG. 35A. In FIGS. 35A and 35B, a reference sign H represents a region illuminated with the sunlight and a reference sign K represent a region shaded by the eaves or the roof. On the other hand, as illustrated in FIG. 35B, the light rays from the sun at a low altitude is not blocked too much by the eaves or the roof and most part of the daylighting film is illuminated.

A degree of dazzling that the person feels is compared between FIGS. 35A and 35B by assuming that the illuminance on the window surface is equal and luminance from the illuminated part of the daylighting film to a direction where the person exists in the room is equal between FIGS. 35A and 35B. An index of dazzling in a large area like the window surface is generally represented by "PGSV" as in the following formula (1). As found from the formula (1), even with the same luminance Ls of glare and the same background luminance Lb, a solid angle ω is greater and a value of PGSV is greater when an area of glare is large. That is, even with the same luminance, if the area of glare is larger, eyes of the person are easily dazzled. Thus, the light rays from the sun at a low altitude easily causes glare.

Accordingly, it is a very important issue to achieve a high daylighting effect without causing glare when the altitude is low.

[Math. 1]

$$PGSV = \log \frac{Ls^{3.2} \cdot \omega^{-0.64}}{Lb^{0.61-0.79 \log \omega}} - 8.2 \qquad (1)$$

An aspect of the invention was made in view of the problems of the related art described above and an object thereof is to provide a daylighting member, a daylighting device, and an installation method for the daylighting member that sufficiently use natural light (sun) and enable to ensure a bright environment in a room and to further suppress glare light regardless of positional change caused by annual motion and diurnal motion of the sun, or, in a case of a window surface that sunlight directly enters, regardless of a direction of the surface.

Solution to Problem

A daylighting member of an aspect of the invention is a daylighting member and includes a first base having optical transparency, a plurality of daylighting portions constituted by a plurality of polygonal prism structures that have optical transparency and are provided on a first surface of the first base, and gaps provided between the plurality of daylighting portions. Each of the polygonal prism structures is a polygon that has four or more vertexes in a sectional shape orthogonal to a longitudinal direction of the polygonal prism structure and has all interior angles less than 180°, the polygon has a first side that is a side of the polygon corresponding to a surface in contact with the first base of the polygonal prism structure, and a plurality of vertexes including a first vertex and a second vertex that are vertexes corresponding to both ends of the first side, and a third vertex that is not positioned on the first side. A length of a line perpendicular to the first side passing the third vertex is longer than lengths of lines perpendicular to the first side passing vertexes other than the third vertex among the plurality of vertexes, a shape of the polygon is asymmetrical with the line perpendicular to the first side passing the third vertex as a center, an angle a formed by a side opposite a fourth vertex with respect to the line perpendicular to the first side passing the third vertex, and the first surface of the base satisfies a range of a formula (2):

[Math. 2]

$$n \times \sin\{a - a'\} \geq \sin 45 \qquad (2)$$
$$a' = \sin^{-1}\left(\frac{1}{n} \times \sin a\right)$$

an angle c formed by a side between the third vertex and the fourth vertex and the first surface of the base satisfies a range of a formula (3):

[Math. 3]

$$c \geq \theta_{nc} \qquad (3)$$

and an angle d formed by a side closer to the second vertex than the fourth vertex and the first surface of the base satisfies a range of a formula (4):

[Math. 4]

$$d > \frac{1}{2}(a' - a + 180) \qquad (4)$$
$$a' = \sin^{-1}\left(\frac{1}{n} \times \sin a\right)$$

where among vertexes positioned on the same side as the second vertex with respect to the line perpendicular to the first side passing the third vertex, a vertex closest to the third vertex is the fourth vertex, n represents a refractive index of the first base and the polygonal prism structure, and θnc represents a critical angle at an interface between a medium having a refractive index of n and a medium having a refractive index of 1.0.

In the daylighting member of an aspect of the invention, the polygon may be a polygon having five or more vertexes, a fifth vertex may exist as a vertex closest to the first vertex among vertexes positioned on the same side as the first vertex with respect to the line perpendicular to the first side passing the third vertex, an angle formed by a side between the fifth vertex and the first vertex and the first surface of the base may be between an angle formed by a surface between the third vertex and the fifth vertex and the first surface of the base and 90°, and a length of a line perpendicular to the first side passing the fifth vertex may be shorter than a length of a line perpendicular to the first side passing the fourth vertex.

In the daylighting member of an aspect of the invention, the polygon may be a polygon having five or more vertexes, a sixth vertex may exist as a vertex closest to the second vertex among vertexes positioned between the fourth vertex and the second vertex, and an angle formed by a side between the sixth vertex and the second vertex and the first surface of the base may be between an angle formed by a side between the fourth vertex and the sixth vertex and the first surface of the base and 90°.

In the daylighting member of an aspect of the invention, the polygon may be a hexagon, a fifth vertex and a sixth vertex coexist, the fifth vertex exists as a vertex closest to the first vertex among vertexes positioned on the same side as the first vertex with respect to the line perpendicular to the first side passing the third vertex, an angle formed by a side between the fifth vertex and the first vertex and the first surface of the base is between an angle formed by a surface between the third vertex and the fifth vertex and the first surface of the base and 90°, a length of a line perpendicular to the first side passing the fifth vertex is shorter than a length of a line perpendicular to the first side passing the fourth vertex, the sixth vertex exists as a vertex closest to the second vertex among vertexes existing between the fourth vertex and the second vertex, and an angle formed by a side between the sixth vertex and the second vertex and the first surface of the base is between an angle formed by a side between the fourth vertex and the sixth vertex and the first surface of the base and 90°.

A daylighting device of an aspect of the invention includes the daylighting member of the aspect of the invention, and a support member that supports the daylighting member, in which external light is taken through the daylighting member.

The daylighting device of an aspect of the invention may further include an accommodation mechanism that folds and accommodates the support member, which supports the daylighting member, the support member being able to be taken in and out.

The daylighting device of an aspect of the invention may further include a winding mechanism that winds up the support member, which supports the daylighting member, the support member being able to be taken in and out.

An installation method for a daylighting member of an aspect of the invention includes arranging a plurality of daylighting portions so that a side of a polygon where an area with respect to a line perpendicular to a first side passing a third vertex is large faces downward in a vertical direction, and installing the daylighting member in a transparent structure. The daylighting member includes a first base having optical transparency, the plurality of daylighting portions constituted by a plurality of polygonal prism structures that have optical transparency and are provided on a first surface of the first base, and gaps provided between the plurality of daylighting portions. Each of the polygonal prism structures is a polygon that has four or more vertexes in a sectional shape orthogonal to a longitudinal direction of the polygonal prism structure and has all interior angles less than 180°, the polygon has the first side that is a side of the polygon corresponding to a surface in contact with the first base of the polygonal prism structure, and a plurality of vertexes including a first vertex and a second vertex that are vertexes corresponding to both ends of the first side, and the third vertex that is not positioned on the first side, a length of the line perpendicular to the first side passing the third vertex is longer than lengths of lines perpendicular to the first side passing vertexes other than the third vertex among the plurality of vertexes, a shape of the polygon is asymmetrical with the line perpendicular to the first side passing the third vertex as a center, an angle formed by a side opposite a fourth vertex with respect to the line perpendicular to the first side passing the third vertex, and the first surface of the base satisfies a range of a formula (5):

[Math. 5]

$$n \times \sin\{a - a'\} \geq \sin 45 \quad (5)$$
$$a' = \sin^{-1}\left(\frac{1}{n} \times \sin a\right)$$

an angle formed by a side between the third vertex and the fourth vertex and the first surface of the base satisfies a range of a formula (6):

[Math. 6]

$$c \geq \theta_{nc} \quad (6)$$

and angle formed by a side closer to the second vertex than the fourth vertex and the first surface of the base satisfies a range of a formula (7):

[Math. 7]

$$d > \frac{1}{2}(a' - a + 180) \quad (7)$$
$$a' = \sin^{-1}\left(\frac{1}{n} \times \sin a\right)$$

where among vertexes positioned on the same side as the second vertex with respect to the line perpendicular to the first side passing the third vertex, a vertex closest to the third vertex is the fourth vertex, n represents a refractive index of the first base and the polygonal prism structure, and θnc represents a critical angle at an interface between a medium having a refractive index of n and a medium having a refractive index of 1.0.

Advantageous Effects of Invention

According to an aspect of the invention, it is possible to provide a daylighting member that enables outside natural light (sunlight) to be efficiently guided into a room and enables a person in the room to feel bright without being dazzled even in an area deep inside the room, a daylighting device that uses such a daylighting member, and an installation method for the daylighting member.

DESCRIPTION OF EMBODIMENTS

Figure 1:
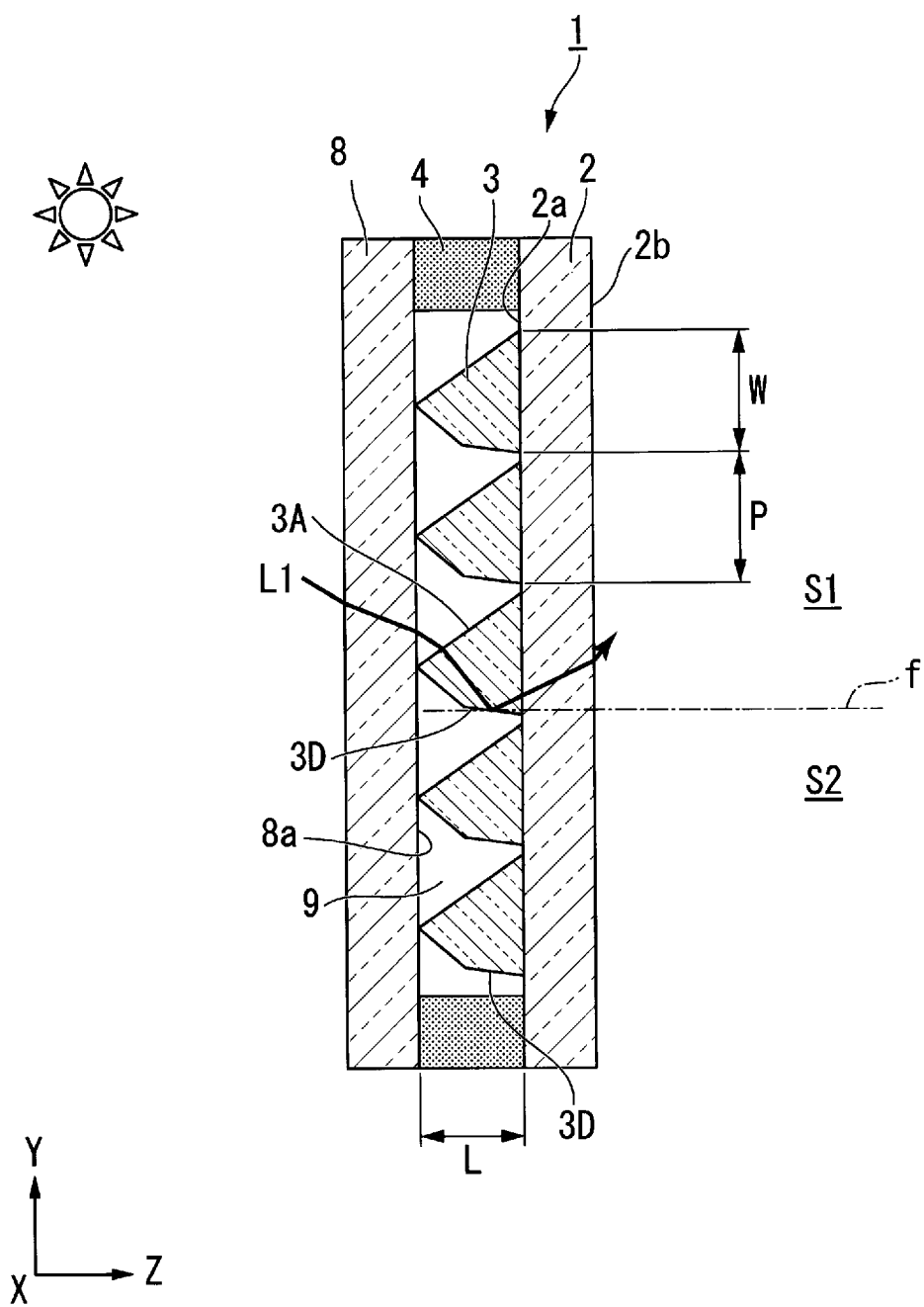
FIG. 1 is a sectional view illustrating an entire configuration of a daylighting member in a first embodiment.

Hereinafter, embodiments of the invention will be described with reference to drawings. Note that, in the drawings used in the following description, a scale of each member is approximately changed in order for each member to be set to be recognizably enlarged.

First Embodiment

A daylighting film of a first embodiment is an example of a daylighting member that guides sunlight into a room, for example, in a form of being attached to a window.

FIG. 1 is a sectional view illustrating an entire configuration of a daylighting member that is the first embodiment of the invention.

Figure 2:
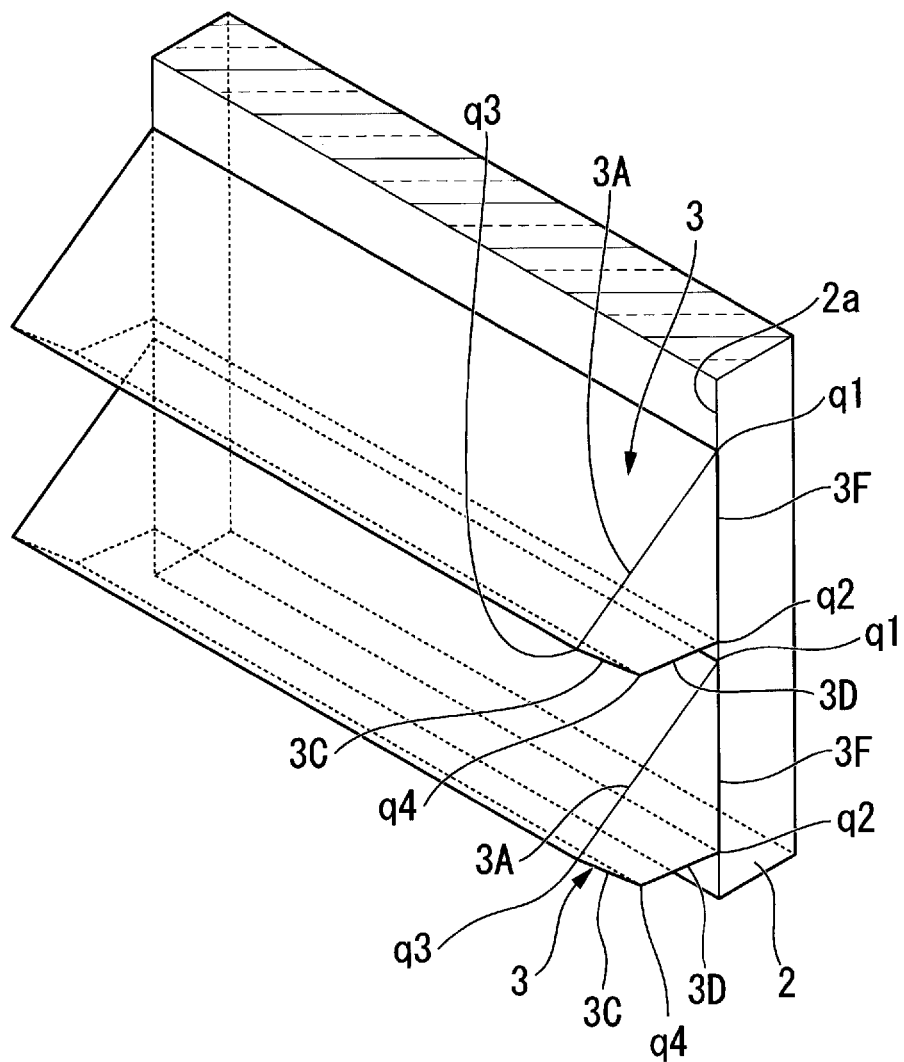
FIG. 2 is a perspective view illustrating a configuration of a plurality of daylighting portions of the daylighting member in the first embodiment.

FIG. 2 is a perspective view illustrating a configuration of a plurality of daylighting portions of the daylighting member in the first embodiment.

Figure 3:
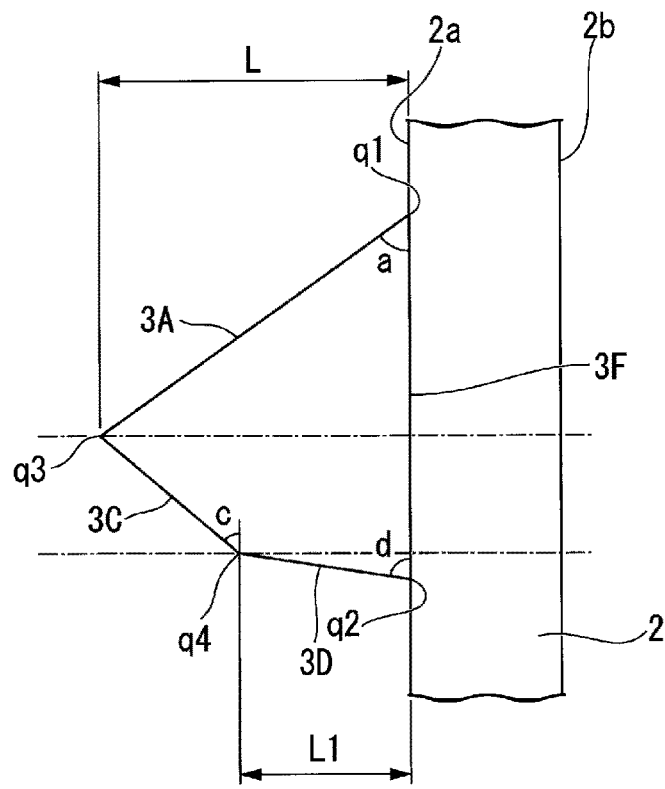
FIG. 3 is a sectional view when each of the daylighting portions of the first embodiment is cut in a direction orthogonal to a longitudinal direction of the daylighting portions.

FIG. 3 is a sectional view when each of the daylighting portions is cut in a direction orthogonal to a longitudinal direction.

As illustrated in FIG. 1, a daylighting film (daylighting member) 1 of the present embodiment includes a first base 2, a plurality of daylighting portions (polygonal prism structures) 3, and a first adhesive layer 4. The plurality of daylighting portions 3 are provided on a first surface 2a of the first base 2. The first adhesive layer 4 is provided on the periphery of the first surface 2a of the first base 2 and functions to bond the entire daylighting film 1 to a window glass (transparent structure) 8. Gaps 9 are provided between the plurality of daylighting portions 3.

Here, an up/down direction on a plane of paper and a vertical direction (XY-direction) of the daylighting film 1 attached to the window glass 8 coincide with each other.

In the present embodiment, the daylighting film 1 is attached to a surface of the window glass 8 on an indoor side.

As the first base 2, a light-transmissive base formed of, for example, resins such as a thermoplastic polymer, thermosetting resin, and photopolymerizable resin is used. A light-transmissive base formed of an acrylic polymer, an olefinic polymer, a vinyl-based polymer, a cellulosic polymer, an amide-based polymer, a fluorinated polymer, a urethane-based polymer, a silicone-based polymer, an imide-based polymer, or the like is used. Specifically, a light-transmissive base such as a triacetyl cellulose (TAC) film, a polyethylene terephthalate (PET) film, a cycloolefin polymer (COP) film, a polycarbonate (PC) film, a polyethylene naphthalate (PEN) film, a polyethersulfone (PES) film, or a polyimide (PI) film is preferably used, for example.

In the present embodiment, a PET film having a thickness of 100 μm is used as the first base 2, for example. A total light transmittance of the first base 2 is preferably equal to or greater than 90% under the provisions of JIS K7361-1. Accordingly, it is possible to obtain sufficient transparency.

The first base 2 may have any thickness and a shape thereof is not limited to a film shape and may be a plate shape. The first base 2 may have a laminated structure in which a plurality of bases are laminated each other.

Each of the daylighting portions 3 is formed of an organic material having optical transparency and slow acting performance, such as acrylic resin, epoxy resin, or silicone resin, for example. A transparent resin mixture obtained by mixing, into such a resin, a polymerization initiator, a coupling agent, a monomer, an organic solvent, etc. is able to be used. Further, the polymerization initiator may contain various additional components, such as a stabilizer, an inhibitor, a plasticizer, a fluorescent brightener, a release agent, a chain transfer agent, and other photopolymerizable monomers.

In the present embodiment, the plurality of daylighting portions 3 are formed on the first base 2 by using a heat imprinting method. The method for forming the daylighting portions 3 is not limited to the heat imprinting method, and a UV imprinting method, a heat pressing method, an injection molding method, an extrusion molding method, a compressive molding method, or the like may be used. The first base 2 and the daylighting portions 3 are integrally formed with the same resin by using a method such as a melt extruding method or a mold extruding method.

In the present embodiment, polymethylmethacrylate (PMMA) is used as an example of the daylighting portions 3. A total light transmittance of the daylighting portions 3 is preferably equal to or greater than 90% under the provisions of JIS K7361-1. Accordingly, it is possible to obtain sufficient transparency.

As illustrated in FIG. 2, each of the daylighting portions 3 linearly extends to be long and narrow in a direction (direction perpendicular to a plane of paper of FIG. 4) and a sectional shape orthogonal to a longitudinal direction is a polygon. Specifically, the daylighting portion 3 is a quadrangle which has four vertexes in a sectional shape thereof and has all internal angles less than 180°. The plurality of daylighting portions 3 are parallel to one side of the first base 2 having a rectangular shape in the longitudinal direction and are disposed at intervals from each other in a width direction. Note that, the adjacent daylighting portions 3 (a first vertex q1 of one of the adjacent daylighting portions 3 and a second vertex q2 of the other daylighting portion 3) may be in contact with each other.

As illustrated in FIG. 3, a sectional shape of each of the daylighting portions 3 includes a first side 3F, a second side 3A, a third side 3C, a fourth side 3D, a first vertex q1, a second vertex q2, a third vertex q3, and a fourth vertex q4. The first vertex q1 and the second vertex q2 are vertexes corresponding to both ends of the first side 3F, a vertex positioned on an upper side is the first vertex q1, and a vertex positioned on a lower side is the second vertex q2. In addition, the third vertex q3 and the fourth vertex q4 are vertexes not positioned on the first side 3F.

Specifically, the first side 3F contacts the first surface 2a of the first base 2. The second side 3A connects the first vertex q1 and the third vertex q3 with each other and constitutes the first vertex q1 together with the first side 3F. The third side 3C connects the third vertex q3 and the fourth vertex q4 with each other, and the fourth side 3D is a side connecting the fourth vertex q4 and the second vertex q2 with each other.

A length L of a line perpendicular to the first side 3F passing the third vertex q3 is longer than a length L1 of a line perpendicular to the first side 3F passing the vertex q4.

That is, the daylighting portion 3 of the present embodiment is a polygonal prism structure in which shapes of both sides are asymmetrical with the line perpendicular to the first side 3F passing the third vertex q3 as the center and a sectional shape is a quadrangle.

An angle a formed by the second side 3A and the first side 3F satisfies a formula (8).

[Math. 8]

$$n \times \sin\{a - a'\} \geq \sin 45 \quad (8)$$
$$a' = \sin^{-1}\left(\frac{1}{n} \times \sin a\right)$$

When c represents an angle formed by the third side 3C and the first side 3F and $\theta_{nc}$ represents a critical angle at an interface between a medium having a refractive index of n and a medium having a refractive index of 1.0, the angle c satisfies a formula (9).

[Math. 9]

$$c \geq \theta_{nc} \quad (9)$$

When an angle formed by the fourth side 3D and the first side 3F is d and an angle of a refractive angle of a light ray incident from the second side 3A is a', the angle d satisfies a formula (10).

[Math. 10]
$$d > \frac{1}{2}(a' - a + 180) \quad (10)$$
$$a' = \sin^{-1}\left(\frac{1}{n} \times \sin a\right)$$

With reference back to FIG. 1, when a width of the daylighting portion 3 in a short-hand direction is W, a height of the daylighting portion 3 in a normal direction of the first base 2 is L, and a pitch of the daylighting portion 3 in an arrangement direction is P, the width W of the daylighting portion 3 in the short-hand direction, the height L thereof, and the pitch P thereof are almost equivalent over all of the daylighting portions 3.

Air exists in each of the gaps 9 provided between the daylighting portions 3 adjacent in the width direction. Accordingly, a refractive index of the gap 9 is approximately 1.0. By setting the refractive index of the gap 9 as 1.0, a critical angle at an interface of the gap 9 and the daylighting portion 3 (the first side 3F to the fourth side 3D) becomes minimum. In the case of the present embodiment, air exists in the gap 9, but inert gas formed of inert gas such as nitrogen may exist in the gap 9 or the gap 9 may be in a decompressive state.

Note that, it is desirable that a refractive index of the first base 2 and a refractive index of the daylighting portion 3 are approximately equivalent to each other. A reason therefor is as follows. For example, in a case where the refractive index of the first base 2 and the refractive index of the daylighting portion 3 are significantly different from each other, when the light is incident on the first base 2 from the daylighting portion 3, unnecessary refraction or reflection of the light may occur in the interface between the daylighting portion 3 and the first base 2. In this case, there may be disadvantages, for example, that desired daylighting performance is not obtained or luminance is reduced.

The first adhesive layer 4 bonds the first surface 2a of the first base 2 to an inner surface 8a of the window glass 8. The first adhesive layer 4 may be provided or may not be provided on the first surface 2a of the first base 2 at first as a component of the daylighting film 1. In a case where the first adhesive layer 4 is not provided, the first adhesive layer 4 may be supplied to the first surface 2a of the first base 2, when performing an operation of attaching the daylighting film 1 to the window glass 8. A general optical adhesive is used as the first adhesive layer 4. It is desirable that a refractive index of the first adhesive layer 4 is equivalent to the refractive index of the first base 2 or the refractive index of the window glass 8. No refraction occurs on the interface of the first adhesive layer 4 and the and the base 2, or the interface of the first adhesive layer 4 and the window glass 8.

The daylighting film 1 having such a configuration described above is, for example, used by being attached to the window glass 8 in a state where a surface side (a first surface 2a side of the first base 2) where the plurality of daylighting portions 3 are formed opposes the inner surface 8a (a surface on the indoor side) of the window glass 8. At this time, the daylighting film 1 is attached to the window glass 8 so that the longitudinal direction of the daylighting portion 3 faces a horizontal direction and the arrangement direction of the plurality of daylighting portions 3 faces a vertical direction. Specifically, as illustrated in FIG. 2, the daylighting film 1 is attached so that the daylighting portion 3 is oriented to have a large area, with respect to a line that is perpendicular to the first side 3F and passes through the third vertex q3 of the daylighting portion 3, on a lower side in the vertical direction and the second side 3A of the daylighting portion 3 is an upper surface.

The light directly delivered from the sun is incident obliquely downward on the daylighting film 1 installed on the window glass 8. The light incident on the daylighting film 1 is transmitted through the window glass 8 and reaches the daylighting portions 3.

Here, for convenience of the description, a point where any one light flux of the light incident on the daylighting portion 3 illustrated in FIG. 1 is incident on the fourth side 3D (reflection side) of the daylighting portion 3 is set as an incident point. A virtual straight line which passes through the incident point and is orthogonal to the first surface 2a of the first base 2 is set as a straight line f. Among two spaces having a horizontal plane including the straight line f as a boundary, a space on a side where the light incident on the incident point exists is set as a first space S1 and a space on a side where the tight incident on the incident point does not exist is set as a second space S2.

For example, the light L1 incident from the second side 3A of the daylighting portion 3 is totally reflected by the fourth side 3D of the daylighting portion 3, is directed obliquely upward, that is, toward the side of the first space S1, and is output from the first side 3F of the daylighting portion 3. The light L1 output from the daylighting portion 3 is transmitted through the first base 2 and output toward the ceiling in the room from the daylighting film 1. The light output from the daylighting film 1 toward the ceiling is reflected by the ceiling and illuminates the inside of the room, and thus the tight is used instead of illumination light. Therefore, in a case where such a daylighting film 1 is used, it is possible to expect an energy saving effect of saving energy consumed by lighting equipment in a building in the daytime.

Figure 4:
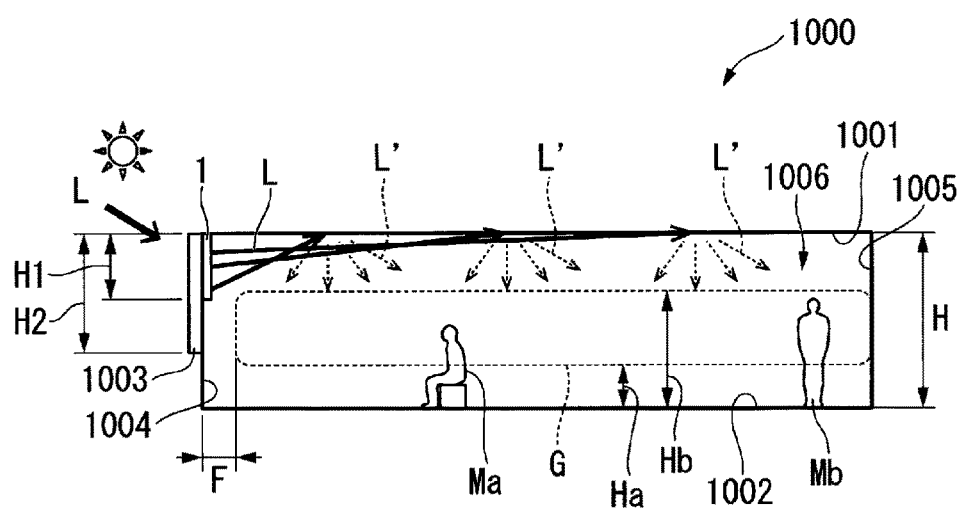
FIG. 4 is a schematic view illustrating an example of a room model.

Here, daylighting performance of the daylighting film 1 will be described by using a room model 1000 illustrated in FIG. 4. FIG. 4 is a schematic view illustrating an example of the room model 1000.

The room model 1000 is, for example, a model provided by assuming usage of the daylighting film 1 in an office. Specifically, the room model 1000 illustrated in FIG. 4 indicates a case where outdoor light L which has passed the window glass 1003 enters obliquely downward the room 1006 surrounded by a ceiling 1001, a floor 1002, a nearest side wall 1004 to which the window glass 1003 is attached, and a farthest side wall 1005 opposing the nearest side wall 1004. The daylighting film 1 is attached to an upper portion side of an inner surface of the window glass 1003 (corresponding to the window glass 8 described above).

In the room model 1000, a height dimension (dimension from the ceiling 1001 to the floor 1002) H of the room 1006 is set as 2.7 m, a lengthwise dimension H2 of the window glass 1003 is set as 1.8 m from the ceiling 1001, and a lengthwise dimension H1 of the daylighting film 1 is set as 0.6 m from the ceiling 1001.

In the room model 1000, there are a person Ma sitting on a chair in the middle of the room 1006 and a person Mb standing on the floor 1002 in the deep inside of the room 1006. An eye level lower limit Ha of the person Ma sitting on the chair is 0.8 m from the floor 1002, and an eye level upper limit Hb of the person Mb standing on the floor 1002 is 1.8 m from the floor 1002.

A region (hereinafter, referred to as a glare region) G where the persons Ma and Mb in the room 1006 are dazzled is a range of the eye levels Ha and Hb of the persons Ma and Mb in the room. In addition, a vicinity of the window glass 1003 in the room 1006 is mainly a region F on which the outdoor light L is directly incident through a lower portion side of the window glass 1003 to which the daylighting film 1 is not attached. This region F is a range of 1 m from the nearest side wall 1004. Accordingly, the glare region G is a range from a position separated from the nearest side wall 1004 by 1 m, which results from excluding the region F, to the farthest side wall 1005, among the height range of 0.8 m to 1.8 m from the floor 1002.

The glare region G is a region regulated on the basis of a position of the eyes in a region where a person move. Even when the room 1006 is brightly illuminated with the light being directed toward the ceiling 1001, a person in the room 1006 easily feels uncomfortable, when an amount of light reaching the glare region G is great.

The daylighting film 1 of the present embodiment is able to relatively increase luminance of the light being directed to the ceiling 1001 while decreasing luminance of the light being directed to the glare region G, among the light L entering the room 1006 through the window glass 1003. Light L' reflected by the ceiling 1001 brightly illuminates the room 1006 over a wide range instead of illumination light. In this case, it is possible to expect an energy saving effect of saving energy consumed by lighting equipment in the room 1006 in the daytime, by turning off the lighting equipment of the room 1006.

Next, definitions of a light incoming angle θin of incoming light Lin incident on the daylighting portion 3 of the daylighting film 1 and a light outgoing angle θout of outgoing light Lout output from the second surface 2*b* of the first base 2 will be described with reference to FIGS. 5 and 6A to 6D.

Figure 5:
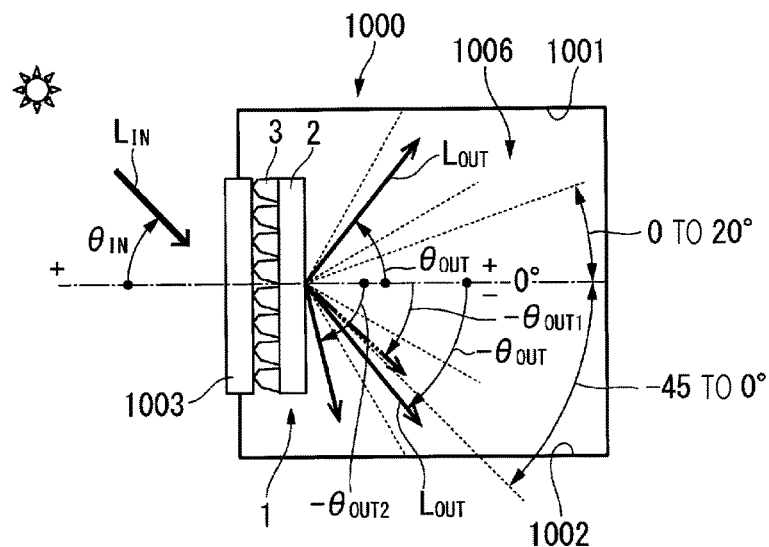
FIG. 5 is a view describing definitions of a light incoming angle θin of incoming light Lin incident on the daylighting portion 3 of a daylighting film 1 and a light outgoing angle θout of outgoing light Lout output from a second surface 2b of a first base 2.

FIG. 5 is a view for explaining definitions of the light incoming angle θin of the incoming light Lin incident on the daylighting portion 3 of the daylighting film 1 and the light outgoing angle θout of the outgoing light Lout output from the second surface 2*b* of the first base 2. FIGS. 6A to 6D are light path views each illustrating a direction in which light incident on the daylighting film 1 is refracted and reflected in accordance with a refractive index difference between the daylighting film and a medium around the daylighting film, is directed and output from a surface of the base on an indoor side. Note that, FIG. 4 is referred to as appropriate.

As illustrated in FIG. 5, when an angle of a direction along a line normal to the first base 2 is set as 0°, the sun is always on the upper side of the line normal to the first base 2, and thus the light incoming angle θin (clockwise angle with respect to the line normal to the first base 2) of the incoming tight Lin from the sun is defined to be positive (+). In the light outgoing angle θout of the outgoing light Lout, a counterclockwise angle with respect to the line normal to the first base 2 is defined to be positive (+) and a clockwise angle with respect to the line normal to the first base 2 is defined to be negative (−). That is, in the light outgoing angle θout, an angle that is on the upper side of the line normal to the first base 2 and in a direction toward the ceiling 1001 is defined to be positive (+) and an angle that is on the lower side of the line normal to the first base 2 and in a direction toward the floor 1002 is defined to be negative (−). A range of angles in which light passes a line of sight of the person in the room and glare is caused is 0 to −45° within a range in which the light outgoing angle θout is negative (−), according to FIG. 4. Thus, when the light outgoing angle θout is −45° or less, the light reaches the floor near the window without passing the line of sight of the person.

Figure 6A:
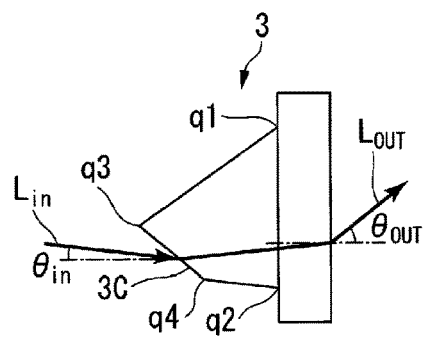
FIG. 6A is a first view illustrating direction in which light incident on the daylighting portion is directed and output.
Figure 6B:
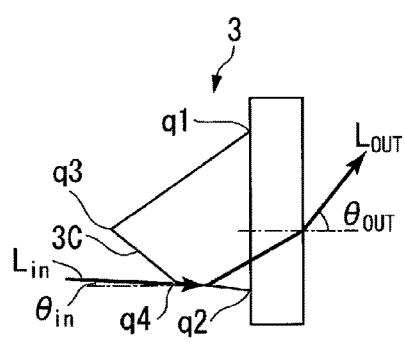
FIG. 6B is a second view illustrating a direction in which light incident on the daylighting portion is directed and output.
Figure 6C:
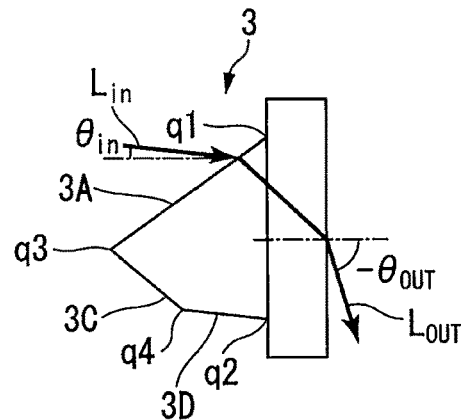
FIG. 6C is a third view illustrating a direction in which light incident on the daylighting portion is directed and output.
Figure 6D:
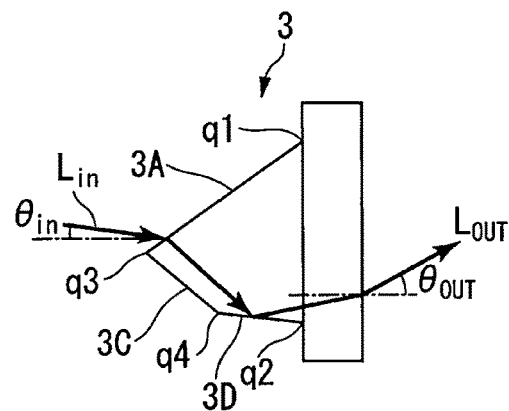
FIG. 6D is a fourth view illustrating a direction in which light incident on the daylighting portion is directed and output.

As illustrated in FIGS. 6A and 6B, the light incident from a side on the lower side (on a side where the second vertex q2 is) with respect to the line perpendicular to the first side 3F passing the third vertex q3, i.e., from the third side 3C in FIG. 6A or the fourth side 3D in FIG. 6B is refracted and directed in an obliquely upward direction and output from the base 2 of the daylighting film 1. At this time, the light outgoing angle θout>0° is satisfied. Among the light incident from a side on the upper side (on the side where the first vertex q1 exists) with respect to the line perpendicular to the first side 3F passing the third vertex q3, i.e., from the second side 3A, the light incident from a vicinity of the first vertex q1 is refracted and directed obliquely downward and output from the base 2 of the daylighting film 1 as illustrated in FIG. 6C. At this time, the light outgoing angle θout<0° is satisfied. As illustrated in FIG. 6D, among the light directed to the second side 3A, the light incident from a vicinity of the third vertex q3 is refracted and directed obliquely downward, is totally reflected by a side on the lower side (on the side where the second vertex q2 exists) with respect to the line perpendicular to the first side passing the third vertex q3, i.e., by the fourth side 3D in FIG. 6D, has a direction changed to an obliquely upward direction, and then is output from the base 2 of the daylighting film 1. At this time, the light outgoing angle θout>0° is satisfied.

Next, an example of a light path of the light that is transmitted through the daylighting portion 3 will be described.

A light incoming angle of the light incident on the daylighting film 1 changes depending on altitude change of the sunlight.

Figure 7A:
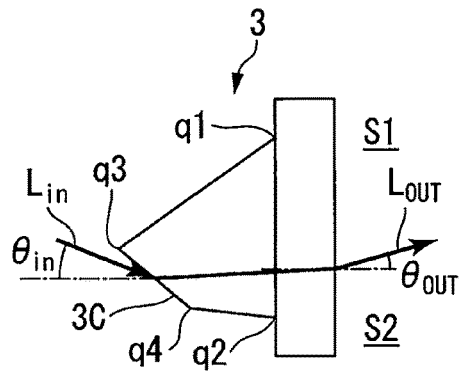
FIG. 7A is a first view illustrating a light path of light transmitted through the daylighting portion of the first embodiment when altitude of the sun is low.
Figure 7B:
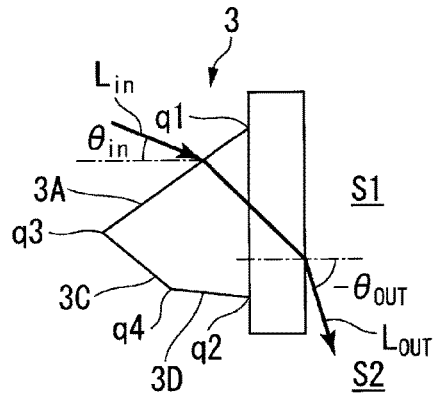
FIG. 7B is a second view illustrating a light path of light transmitted through the daylighting portion of the first embodiment when the altitude of the sun is low.
Figure 7C:
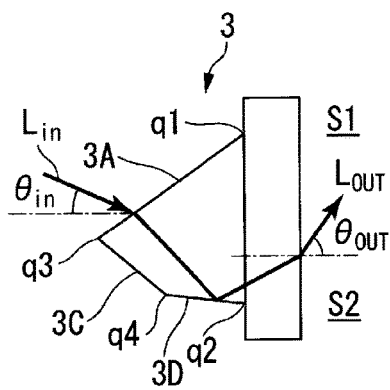
FIG. 7C is a third view illustrating a light path of light transmitted through the daylighting portion of the first embodiment when the altitude of the sun is low.

FIGS. 7A to 7C each illustrates a light path of the light that is transmitted through the daylighting portion 3 when the altitude is less than 30° (light incoming angle θin<30°).

An angle a formed by the second side 3A and the first side 3F satisfies the formula (1) described above. When c represents an angle formed by the third side 3C and the first side 3F and θnc represents a critical angle at an interface between a medium having a refractive index of n and a medium having a refractive index of 1.0, the angle c satisfies the formula (2) described above. When an angle formed by the fourth side 3D and the first side 3F is d and an angle of a refractive angle of the light ray incident from the second side 3A is a', the angle d satisfies the formula (3) described above.

As illustrated in FIG. 7A, the light L incident from the third side 3C of the daylighting portion 3 is refracted by the third side 3C, and then is directed obliquely upward, and is output from the daylighting film 1 toward the first space S1. As illustrated in FIG. 7B, the light L incident from a vicinity of the first vertex q1 on the second side 3A of the daylighting portion 3 is refracted by the second side 3A, is directed obliquely downward, is further refracted obliquely downward by the second surface 2*b* of the first base 2, and output toward the second space S2. As illustrated FIG. 7C, the light ray incident from a vicinity of the third vertex q3 on the second side 3A is refracted by the second side 3A and is directed obliquely downward. The light ray is totally reflected by the fourth side 3D, is directed obliquely upward by changing a direction, is further refracted obliquely upward by the second surface 2*b* of the first base 2, and output toward the first space S1.

Figure 8A:
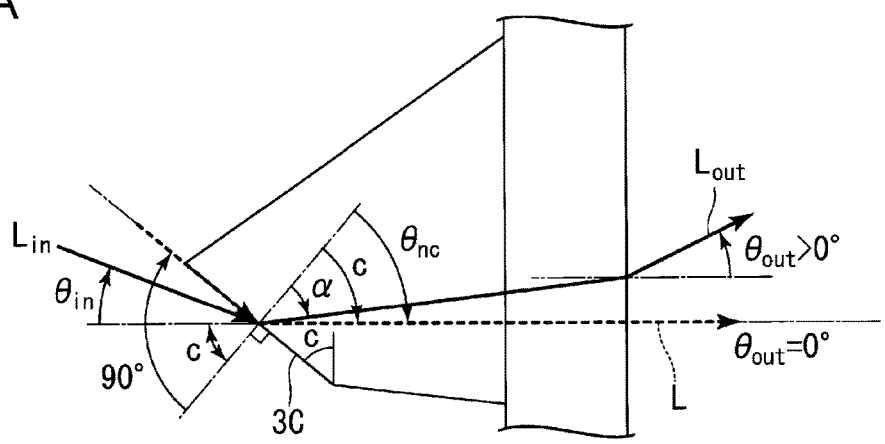
FIG. 8A is a first view illustrating a relationship between an incoming light ray on each side, a light path thereof, a light outgoing angle, and an angle of each side.
Figure 8B:
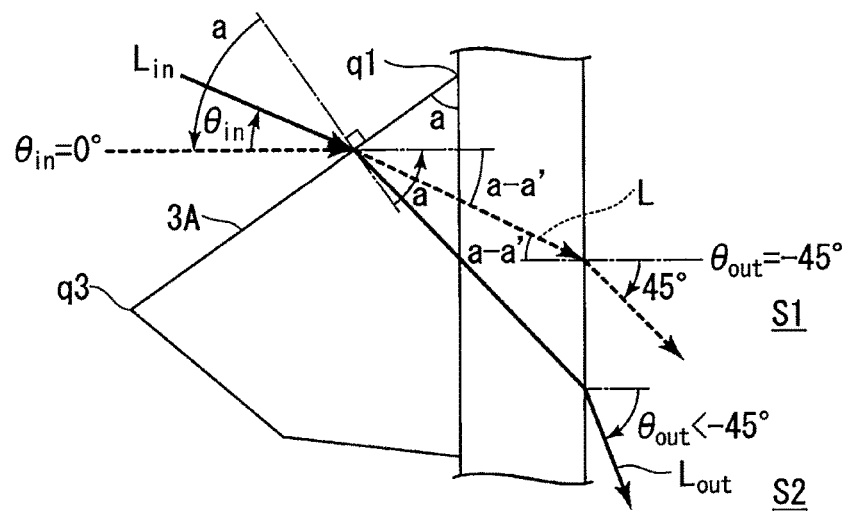
FIG. 8B is a second view illustrating a relationship between an incoming light ray on each side, a light path thereof, a light outgoing angle, and an angle of each side.
Figure 8C:
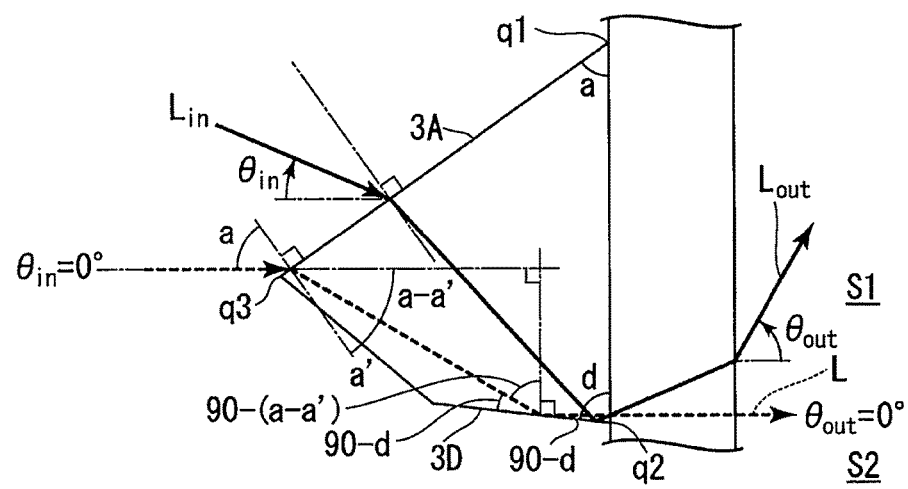
FIG. 8C is a third view illustrating a relationship between an incoming light ray on each side, a light path thereof, a light outgoing angle, and an angle of each side.

FIGS. 8A to 8C each illustrates a relationship between an incoming light ray from each side, a light path thereof, a light outgoing angle, and an angle of each side in detail.

As illustrated in FIG. 8A, in a case where a light incoming angle of the sunlight is set as θin, when a light incoming angle (c+θin) to the third side 3C is smaller than 90°, the sunlight may be incident from the third side 3C.

A refractive index of a material of the daylighting portion 3 is set as n. When (c+θin) represents the light incoming angle to the third side 3C, a refractive angle is α, and θnc represents a critical angle at an interface between the daylighting portion 3 formed of the material having a refractive index of n and air having a refractive index of 1.0, α is greatest when the critical angle is θnc.

Since the angle c satisfies the formula (2), θnc is smaller than the angle c. A light ray whose refractive angle α is smaller than the angle c and which is incident from the third side 3C is directed obliquely upward after refraction, is further refracted obliquely upward by the second surface 2b of the first base 2, and is directed toward a ceiling at the light outgoing angle θout. The light outgoing angle θout from the daylighting film 1 satisfies θout>0°. Thus, the incoming light from the third side 3C provides a daylighting effect of illuminating the ceiling.

As illustrated in FIG. 8B, when the incoming light ray Lin is incident on the daylighting portion 3 at θin and output from the daylighting film 1 at the light outgoing angle θout, the light outgoing angle θout is negative (−). The light outgoing angle is greatest (closest to horizontal (0°)) in the case of the light incoming angle θin=0°.

When the light incoming angle θin is 0°, an angle of the refractive angle in the case of incidence on the second side 3A at the angle a is set as a'.

The refractive angle a' is as indicated with a formula (11).

[Math. 11]

$$n \sin(a') = \sin(a) \quad (11)$$

In the light ray incident on a side closer to the first vertex q1 among the light directed to the second side 3A, the light ray after refraction is directed obliquely downward to be inclined by (a−a') from horizontal, is refracted by the second surface 2b of the first base 2, and further output obliquely downward. The light outgoing angle θout from the daylighting film 1 is as indicated with a formula (12).

Since the second side 3A satisfies the formula (8), the light outgoing angle θ<−45° is satisfied, and the light ray incident from the second side 3A does not cause glare in the room.

[Math. 12]

$$n \sin(a-a') = \sin \theta_{out} \quad (12)$$

As illustrated in FIG. 8C, the light ray Lin incident on a side closer to the third vertex q3 on the second side 3A is refracted by the second side 3A and is directed toward obliquely downward. The light ray Lin is totally reflected by the fourth side 3D, is directed toward obliquely upward by changing a direction, is further refracted obliquely upward by the second surface 2b of the first base 2, and output toward the first space S1.

When an angle formed by the fourth side 3D and the base is d and an angle of a refractive angle of the light ray incident from the second side 3A at the light incoming angle a is a', the angle d satisfies the formula (4) described above.

Among the light directed to the second side 3A, the light ray incident on a side closer to the third vertex q3 is refracted, is directed obliquely downward, is totally reflected by the fourth side 3D, changes a direction to an obliquely upward direction, and then is directed from the daylighting film 1 toward the ceiling with the light outgoing angle θout being positive (+). Thus, among the light directed to the second side 3A, the light incident from the side closer to the third vertex q3 provides a daylighting effect of illuminating the ceiling.

FIGS. 9A to 9D each illustrates a light path of light that is transmitted through the daylighting portion 3 when the altitude is 30° or more (light incoming angle θin≥30°).

Figure 9A:
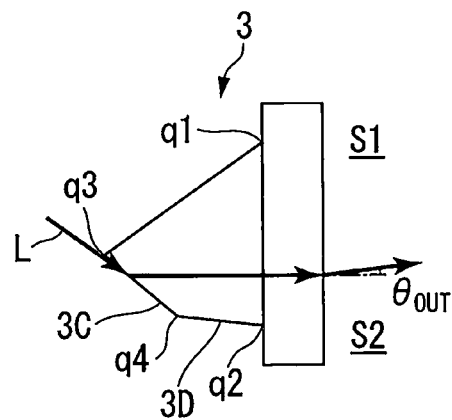
FIG. 9A is a first view illustrating a light path of light transmitted through the daylighting portion of the first embodiment when the altitude of the sun is high.
Figure 9B:
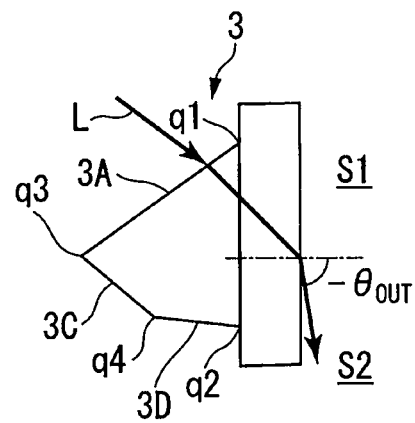
FIG. 9B is a second view illustrating a light path of light transmitted through the daylighting portion of the first embodiment when altitude of the sun is high.
Figure 9C:
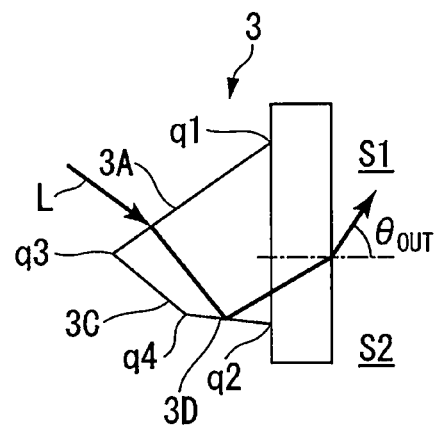
FIG. 9C is a third view illustrating a light path of light transmitted through the daylighting portion of the first embodiment when the altitude of the sun is high.
Figure 9D:
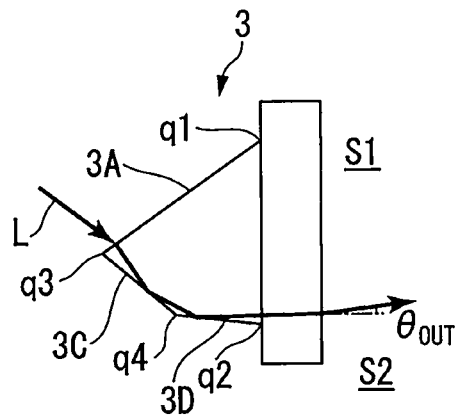
FIG. 9D is a fourth view illustrating a light path of light transmitted through the daylighting portion of the first embodiment when the altitude of the sun is high.

As illustrated in FIG. 9A, the light L incident from the third side 3C of the daylighting portion 3 is refracted by the third side 3C, and then is directed obliquely upward, and is output from the daylighting film 1 toward the first space S1. Compared to the case of θin<30° in FIG. 7A, θout is small. As illustrated in FIG. 9B, the light L incident from a side closer to the first vertex q1 on the second side 3A of the daylighting portion 3 is refracted by the second side 3A, is directed toward obliquely downward, is further refracted obliquely downward by the second surface 2b of the first base 2, and output toward the second space S2. Compared to the case of θin<30° in FIG. 7B, θout is small. As illustrated in FIG. 9C, the light ray incident from a side closer to the third vertex q3 on the second side 3A is incident on the second side 3A and then refracted, and is directed toward obliquely downward. The light is totally reflected by the fourth side 3D, is directed toward obliquely upward by changing a direction, is further refracted obliquely upward by the second surface 2b of the first base 2, and output toward the first space S1. Compared to the case of θin<30° in FIG. 7C, θout is large. As illustrated in FIG. 9D, the light ray incident from a vicinity of the third vertex q3 on the second side 3A is incident on the second side 3A and then refracted, and is directed toward obliquely downward. The light ray is totally reflected by the third side 3C, and then, is further totally reflected by the fourth side 3D, is directed toward obliquely upward by changing a direction, is further refracted obliquely upward by the second surface 2b of the first base 2, and output toward the first space S1. The light outgoing angle θout>0° is satisfied.

Figure 10:
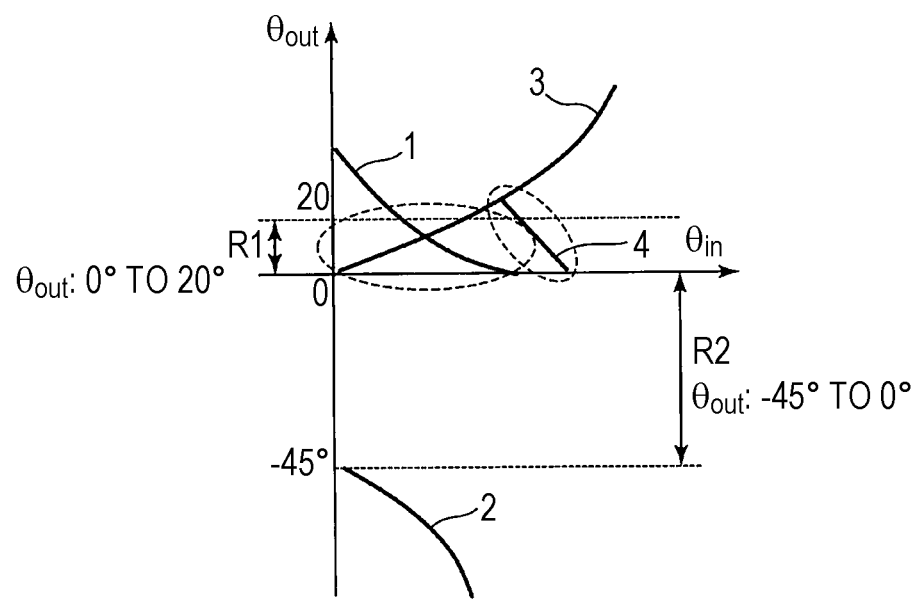
FIG. 10 illustrates a relationship between "the light incoming angle θin and the light outgoing angle θout" with respect to each side of a polygon of the daylighting portion 3 in the daylighting film 1 of the first embodiment.

FIG. 10 illustrates a relationship between the light incoming angle θin and the light outgoing angle θout with respect to each side of the quadrangle of the daylighting portion 3 in the daylighting film 1 of the present embodiment. The light ray that satisfies θout>0° is directed to the ceiling and contributes to a daylighting effect. In particular, the light ray that is output with θout as 0 to 20° as indicated with a range R1 is directed also to an inner part of the ceiling and provides an effect of illuminating the entire room. The light ray whose light outgoing angle θout is −45 to 0° as indicated with a range R2 passes the line of sight of the person in the room and causes glare. The light ray in which the tight outgoing angle θout<−45° is satisfied is directed to the floor near the window side of the room.

An incoming light ray from the third side 3C is denoted by a reference sign 1 in FIG. 10. The incoming light ray 1 is a light ray that satisfies θout>0° with respect to all θin and contributes to daylighting. When θin is around 0°, θout>20° is satisfied, but the incoming light ray 1 has an inclination to fall to the right (negative inclination) and θout=0° is reached at a certain θin. An incoming light ray from a vicinity of the first vertex q1 on the second side 3A is denoted by (2). With respect to all θin, θout<−45° is satisfied and no glare is caused. An incoming light ray from a vicinity of the third vertex q3 on the second side 3A is denoted by (3). The incoming light ray (3) is a light ray that satisfies θout>0° with respect to all θin and contributes to daylighting. When θin is around 0°, θout=0° is satisfied, and the incoming light ray (3) has an inclination to rise to the right (positive inclination).

(1) and (3) cross each other in the range where θout=0 to 20°. An incoming light ray from a vicinity of the third vertex q3 on the second side 3A is denoted by (4). The incoming light ray (4) is a light ray that satisfies θout>0° with respect to all θin and contributes to daylighting. The light outgoing angle θout<20° is satisfied.

According to the relationship between the light incoming angle and the light outgoing angle, any of (1), (3), and (4) has θout in the range of 0 to 20° with respect to any θin. That is, even when the altitude of the sun changes, there is always a light ray directed to the inner part of the ceiling, and the entire room is illuminated, and thus a high power saving effect is achieved. Meanwhile, even when θin changes, no glare is caused.

According to the configuration of the daylighting film 1 of the present embodiment, it is possible to efficiently cause the light L that has entered the room 1006 through the window glass 1003 (daylighting film 1) to be directed to the ceiling 1001. In the present embodiment, it is possible to relatively increase luminance of the light being directed to the ceiling 1001 while decreasing luminance of the light being directed to the glare region G or the light being directed to the floor 1002, among the light L that has entered the room 1006 through the window glass 1003. Therefore, the glare light is suppressed not to cause the person Ma or Mb in the room 1006 to be dazzled, and it is possible to ensure a bright environment of the room 1006 by sufficiently using outdoor natural light (sunlight).

Second Embodiment

Next, a daylighting film 12 of a second embodiment in the invention will be described.

A basic configuration of the daylighting film 12 of the present embodiment indicated below is approximately similar to that of the first embodiment, but a sectional shape of a daylighting portion 13 is different therefrom. Accordingly, in the following description, a shape of the daylighting portion 13 will be described in detail and the description of common parts will be omitted. In each drawing used in the description, components which are common with those in FIGS. 1 to 10 are given the same reference signs.

Figure 11:
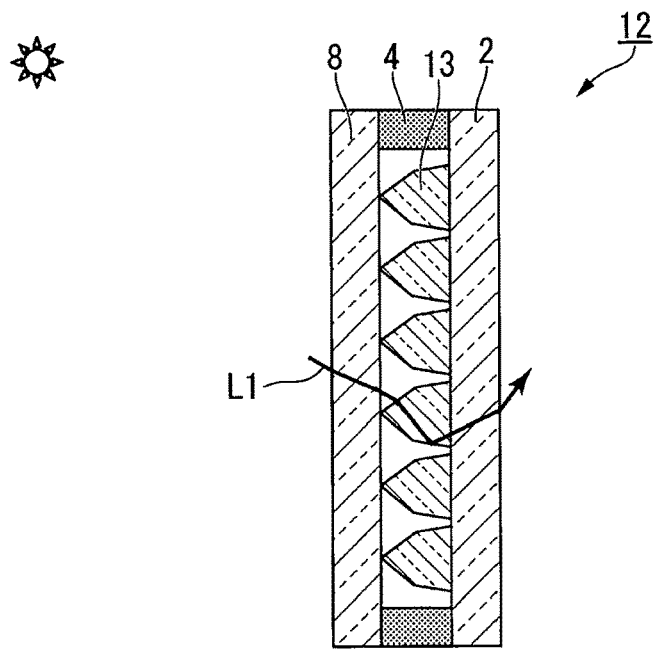
FIG. 11 is a sectional view illustrating an entire configuration of a daylighting member in a second embodiment.

FIG. 11 illustrates an entire configuration of the daylighting film 12 of the second embodiment.

Figure 12:
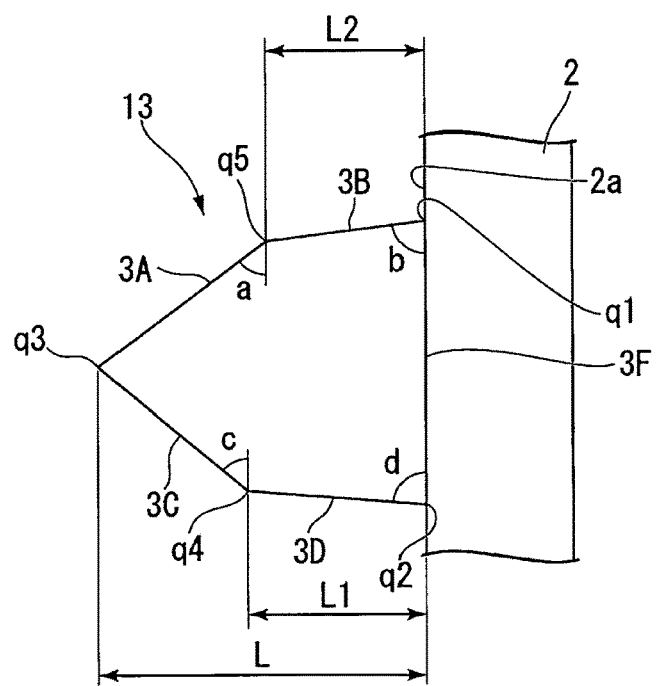
FIG. 12 illustrates a sectional shape of a daylighting portion of the second embodiment.

FIG. 12 illustrates a sectional shape of the daylighting portion 13 of the second embodiment.

As illustrated in FIG. 11, the daylighting film 12 in the present embodiment includes a plurality of daylighting portions 13 whose sectional shape orthogonal to the longitudinal direction is a pentagon.

As illustrated in FIGS. 11 and 12, each of the plurality of daylighting portions 13 includes the first side 3F, the second side 3A, the third side 3C, the fourth side 3D, a fifth side 3B, the first vertex q1, the second vertex q2, the third vertex q3, the fourth vertex q4, and a fifth vertex q5, and the first side 3F side is in contact with the first surface 2a of the first base 2.

In the daylighting portion 13, among vertexes corresponding to both ends of the first side 3F in contact with the first surface 2a of the first base 2, a vertex positioned on the upper side is the first vertex q1, and a vertex positioned on the lower side is the second vertex q2. The third vertex q3 is a vertex which is not positioned on the first side 3F and is most separated from the first side 3F. A vertex positioned on the lower side of the line perpendicular to the first side 3F passing the third vertex q3 is the fourth vertex q4. A vertex positioned on the upper side of the line perpendicular to the first side 3F passing the third vertex q3 is the fifth vertex q5. An angle b formed by the fifth side 3B and the first side 3F is between the angle a formed by the second side 3A and the first side 3F and 90°. That is, a<b<90° is satisfied.

A length L of the line perpendicular to the first side 3F passing the third vertex q3 is longer than lengths L1 and L2 of lines perpendicular to the first side 3F passing the vertexes q4 and q5 other than the third vertex q3 among the plurality of vertexes.

The length L1 of the line perpendicular to the first side 3F passing the fourth vertex q4 is longer than the length L2 of the line perpendicular to the first side 3F passing the fifth vertex q5.

As described above, the daylighting portion 13 of the present embodiment also has a shape in which shapes of both sides are asymmetrical with the line perpendicular to the first side 3F passing the third vertex q3 as the center. That is, the daylighting portion 13 has a shape in which a volume of a lower part including the second vertex q2 and the fourth vertex q4 is greater than a volume of an upper part including the first vertex q1 and the fifth vertex q5.

Enhancement of a daylighting effect per unit area of the base is able to be realized by densely arranging parts of the daylighting member that contribute to daylighting, that is, by setting a pitch P of FIG. 1 as a small value. When a side (base side) closer to the first vertex q1 on the second side 3A, which does not contribute to the daylighting effect, is inclined at an angle which is almost vertical to the base, the width W of the daylighting member is reduced and thus the value of the pitch P is able to be reduced. As a result, a proportion of the parts that contribute to daylighting per unit area increases and the daylighting effect is able to be further enhanced.

Third Embodiment

A basic configuration of a daylighting film 22 of the present embodiment indicated below is approximately similar to that of the first embodiment, but a sectional shape of a daylighting portion 23 is different therefrom. Accordingly, in the following description, a shape of the daylighting portion 23 will be described in detail and the description of common parts will be omitted. In each drawing used in the description, components which are common with those in FIGS. 1 to 12 are given the same reference signs.

Figure 13:
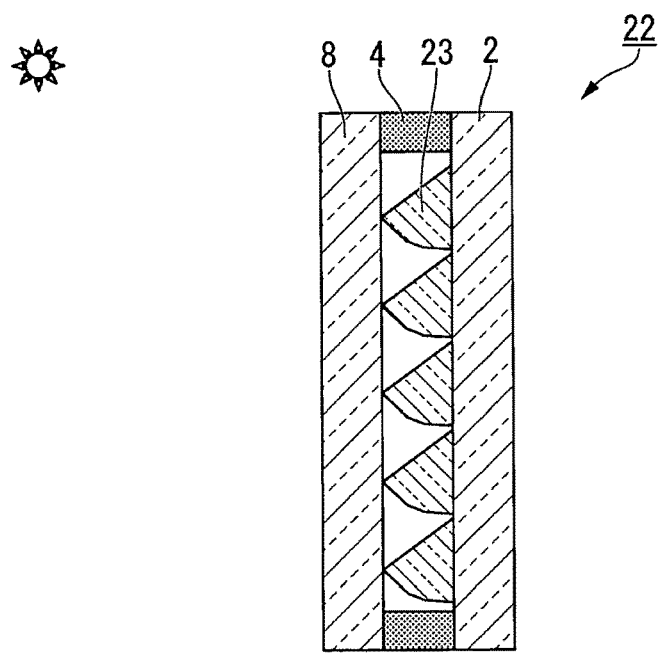
FIG. 13 is a sectional view illustrating an entire configuration of a daylighting member in a third embodiment.

FIG. 13 illustrates an entire configuration of the daylighting 22 of the third embodiment.

Figure 14:
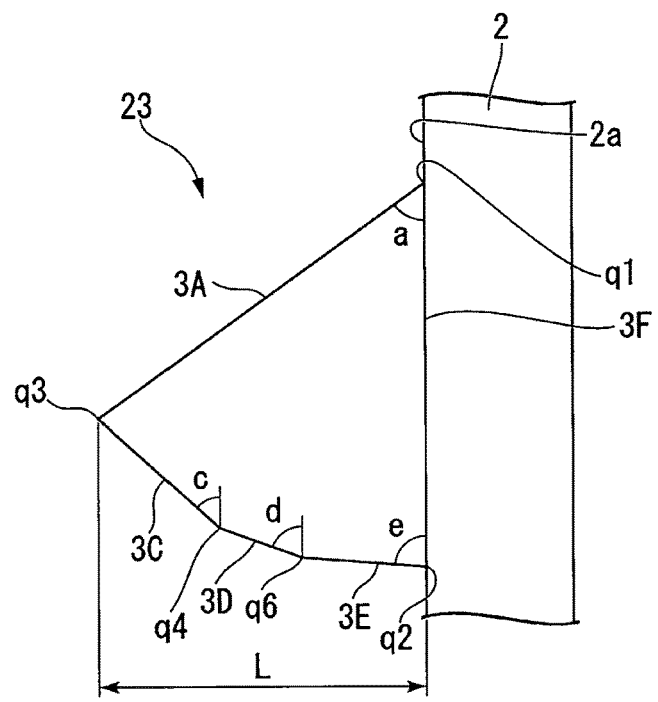
FIG. 14 illustrates a sectional shape of a daylighting portion of the third embodiment.

FIG. 14 illustrates a sectional shape of the daylighting portion 23 of the third embodiment.

As illustrated in FIG. 13, the daylighting film 22 in the present embodiment has a plurality of daylighting portions 23 whose sectional shape orthogonal to the longitudinal direction is a pentagon.

Figure 15:
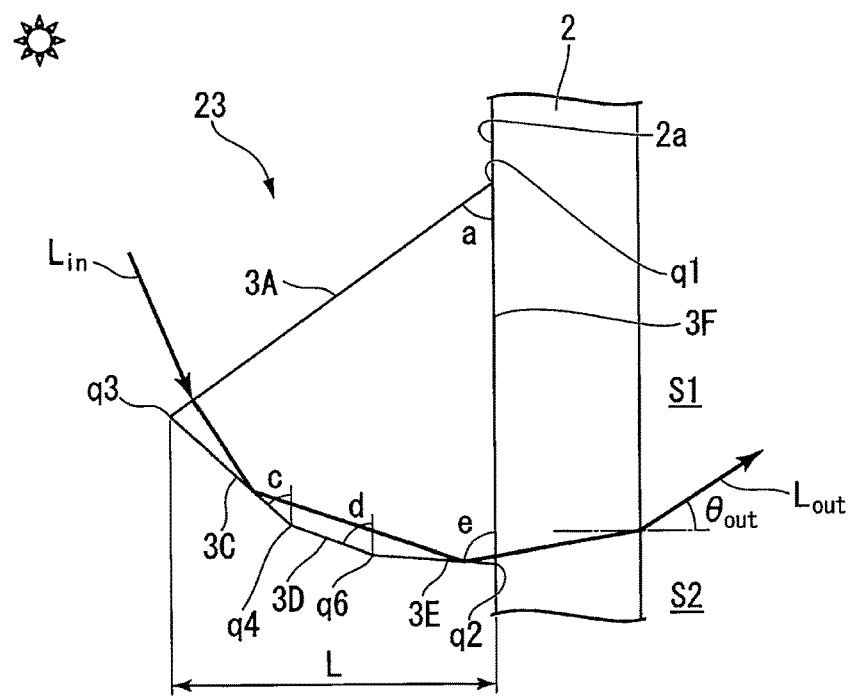
FIG. 15 illustrates a light path of light incident on the daylighting portion of the third embodiment.

As illustrated in FIGS. 13, 14, and 15, each of the plurality of daylighting portions 23 has the first side 3F, the second side 3A, the third side 3C, the fourth side 3D, a sixth side 3E, the first vertex q1, the second vertex q2, the third vertex q3, the fourth vertex q4, and the sixth vertex q6, and the first side 3F side is in contact with the first surface 2a of the first base 2.

In the daylighting portion 23, among vertexes corresponding to both ends of the first side 3F in contact with the first surface 2a of the first base 2, a vertex positioned on the upper side is the first vertex q1, and a vertex positioned on the lower side is the second vertex q2. The third vertex q3 is a vertex which is not positioned on the first side 3F and is most separated from the first side 3F. Among vertexes positioned on the lower side of the line perpendicular to the first side 3F passing the third vertex q3, a vertex closer to the third vertex is the fourth vertex q4 and a vertex closer to the second vertex is the sixth vertex q6. An angle e formed by the sixth side 3E and the first side 3F is between the angle d formed by the fourth side 3D and the first side 3F and 90°. That is, d<e<90° is satisfied.

FIG. 15 illustrates a light path view of light incident from a vicinity of the third vertex q3 on the second side 3A when the altitude of the sun is much higher and exceeds 60° (light incoming angle θin>60°). The light incident from the vicinity of the third vertex q3 on the second side 3A is refracted to be directed obliquely downward, is totally reflected by the third side 3C, and then further totally reflected by the sixth side 3E, changes a direction to an upward direction, is further refracted obliquely upward by the second surface 2b of the first base 2, and output toward the first space S1. The light outgoing angle θout is in a range of about 0 to 20° and the light serves as a light ray that illuminates the inner part of the ceiling, and contributes daylighting.

Figure 16:
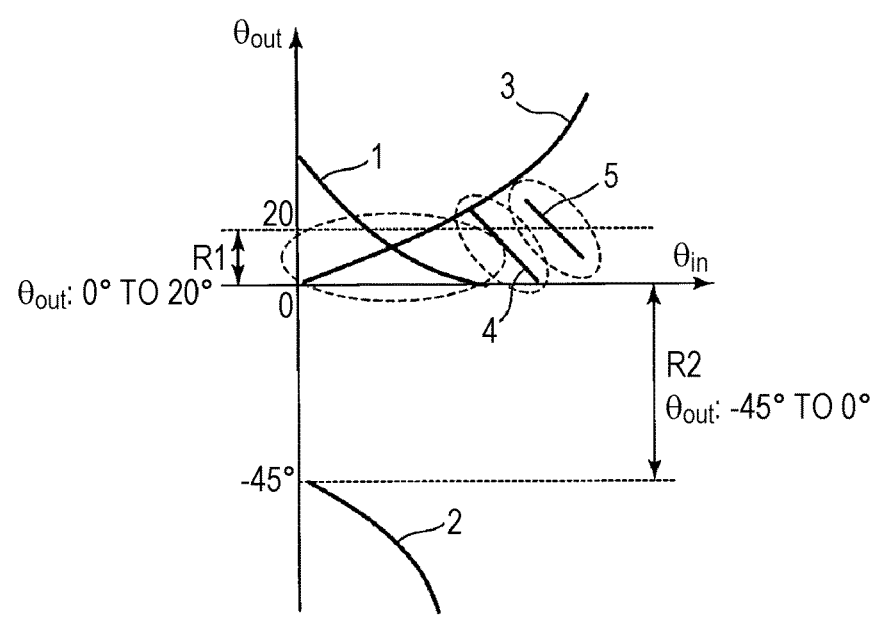
FIG. 16 illustrates a relationship between "the light incoming angle θin and the light outgoing angle θout" with respect to each side of a polygon of the daylighting portion 23 in a daylighting film 22 of the third embodiment.

The light outgoing angle θout of the light incident from the vicinity of the third vertex q3 on the second side 3A when the light incoming angle θin is in a range exceeding 60° is denoted by a reference sign 5 in FIG. 16. According to FIG. 16, the daylighting effect is able to be achieved also when the altitude of the sun is high and exceeds 60° (light incoming angle θin>60°).

Fourth Embodiment

A basic configuration of a daylighting film 32 of the present embodiment indicated below is approximately similar to that of the first embodiment, but a sectional shape of a daylighting portion 33 is different therefrom. Accordingly, in the following description, a shape of the daylighting portion 33 will be described in detail and the description of common parts will be omitted. In each drawing used in the description, components which are common with those in FIGS. 1 to 16 are given the same reference signs.

Figure 17:
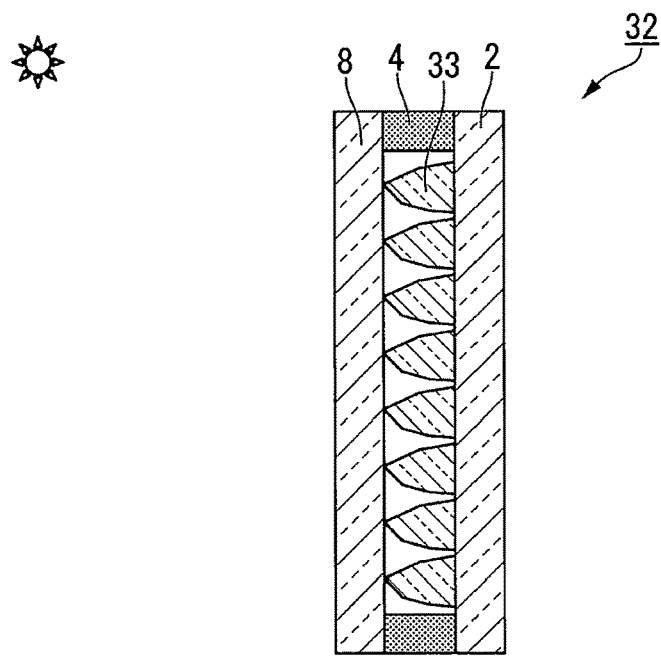
FIG. 17 is a sectional view illustrating an entire configuration of a daylighting member in a fourth embodiment.

FIG. 17 illustrates an entire configuration of the daylighting film 32 of the fourth embodiment.

Figure 18:
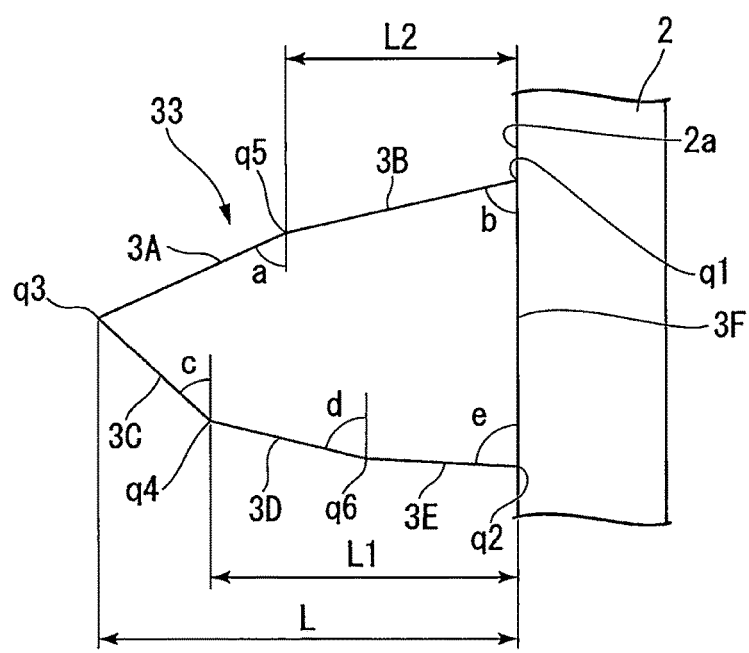
FIG. 18 illustrates a sectional shape of a daylighting portion of the fourth embodiment.

FIG. 18 illustrates a sectional shape of the daylighting portion 33 of the fourth embodiment.

As illustrated in FIG. 17, the daylighting film 32 in the present embodiment includes a plurality of daylighting portions 33 whose sectional shape orthogonal to the longitudinal direction is a hexagon.

As illustrated in FIGS. 17 and 18, each of the plurality of daylighting portions 33 includes the first side 3F, the second side 3A, the third side 3C, the fourth side 3D, the fifth side 3B, the sixth side 3E, the first vertex q1, the second vertex q2, the third vertex q3, the fourth vertex q4, the fifth vertex q5, and the sixth vertex q6, and the first side 3F side is in contact with the first surface 2a of the first base 2.

In the daylighting portion 33, among vertexes corresponding to both ends of the first side 3F in contact with the first surface 2a of the first base 2, a vertex positioned on the upper side is the first vertex q1, and a vertex positioned on the lower side is the second vertex q2. The third vertex q3 is a vertex which is not positioned on the first side 3F and is most separated from the first side 3F. Among vertexes positioned on the lower side of the line perpendicular to the first side 3F passing the third vertex q3, a vertex closer to the third vertex is the fourth vertex q4 and a vertex closer to the second vertex is the sixth vertex q6. A vertex positioned on the upper side of the line perpendicular to the first side 3F passing the third vertex q3 is the fifth vertex q5. An angle formed by the first side 3F and each of the sides, i.e., the second side 3A, the third side 3C, and the fourth side 3D is similar to that of [First embodiment]. The angle formed with the fifth side 3B is similar to that of [Second embodiment] and the angle formed with the sixth side 3E is similar to that of [Third embodiment]. By setting the sectional shape of the daylighting portion 33 as a hexagon constituted by the first side to sixth side, the daylighting effect and properties of suppressing glare due to each of the sides in [First embodiment] to [Third embodiment] are able to be achieved together. In the daylighting effect, an enhanced daylighting effect per unit area for illuminating the inner part of the ceiling regardless of change in θin is achieved. On the other hand, no glare is caused. Accordingly, the daylighting film 32 makes it possible to realize a comfortable light environment of the room in which a power saving effect is high.

Fifth Embodiment

Next, a daylighting film 42 of a fifth embodiment in the invention will be described.

A basic configuration of the daylighting film 42 of the present embodiment indicated below is approximately similar to that of the first embodiment, but a structure around a daylighting portion is different therefrom. Accordingly, in the following description, the structure of the daylighting portion will be described in detail and the description of common parts will be omitted. In each drawing used in the description, components which are common with those in FIG. 4 are given the same reference signs.

Figure 19:
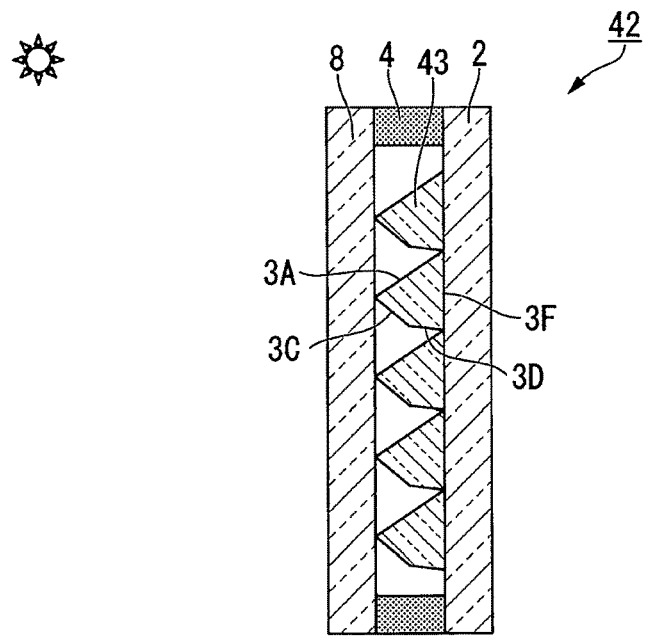
FIG. 19 illustrates another example of configuration of the daylighting film in the first embodiment.

FIG. 19 illustrates an entire configuration of the daylighting film 42 of the fifth embodiment.

As illustrated in FIG. 19, in the daylighting film 42 of the present embodiment, adjacent daylighting portions 43 are disposed to be adjacent to each other and ends of the first side 3F of each of the daylighting portions 43 (the first vertex q1 of one of the adjacent daylighting portions 43 and the second vertex q2 of the other daylighting portion 43) are in contact with each other.

Figure 20:
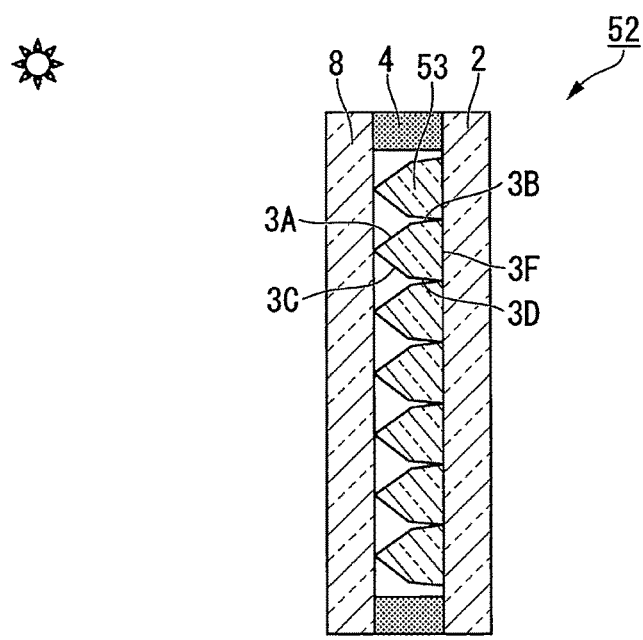
FIG. 20 illustrates another example of configuration of the daylighting film in the second embodiment.
Figure 21:
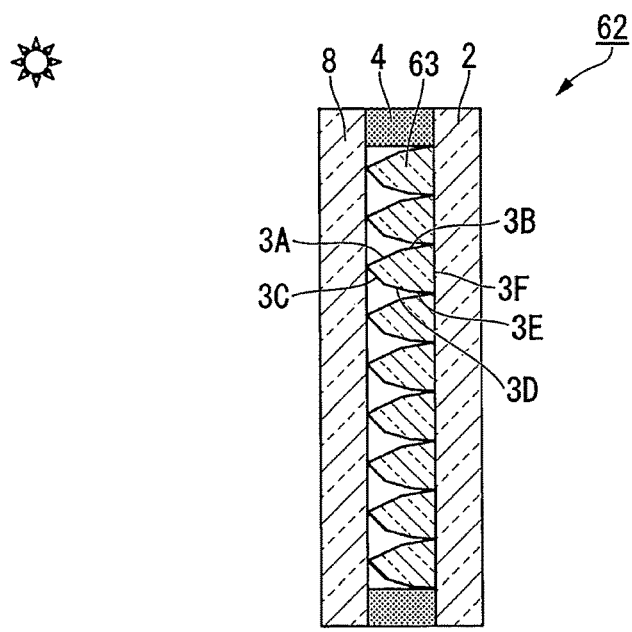
FIG. 21 illustrates another example of configuration of the daylighting film in the fourth embodiment.

As another configuration example of the daylighting film in the second embodiment and the fourth embodiment described above, a daylighting film 52 or 62 that has a configuration in which the adjacent daylighting portions 13 or adjacent daylighting portions 53 or 63 are disposed to be adjacent to each other may be used, as illustrated in FIGS. 20 and 21.

In each of the embodiments described above, the daylighting film 1, 12, 22, 32, 42, 52, or 62 is attached to the surface of the interior side of the window glass 8, but the daylighting film 1, 12, 22, 32, 42, 52, or 62 may be attached to the surface of the exterior side (outdoor side) of the window glass 8. In both cases, the attaching may be performed in a state where the first base 2 faces the interior side. In addition, the daylighting film 1, 12, 22, 32, 42, 52, or 62 may be installed between two glass pieces as a double window.

The configuration of the window glass 8 according to each of the embodiments described above is not limited to a case of being installed in a window frame of a fixed type as described above, and may be a configuration of being installed in a window frame of an opening and closing type, for example. For example, the window glass may be installed in a window frame of a rotation type of being rotated in a vertical direction or a rotation type of being rotated in a horizontal direction, or may be installed in a window frame of a slide type of being slid in a vertical direction or a horizontal direction.

Sixth Embodiment (Rolling Screen)

Next, a rolling screen (daylighting device) 301 illustrated in FIGS. 22 and 23 will be described as a sixth embodiment of the invention, for example.

Figure 22:
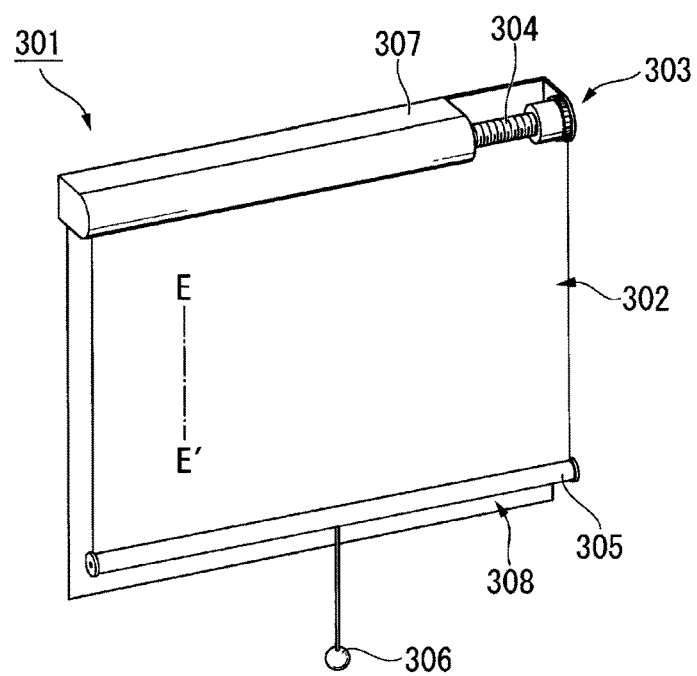
FIG. 22 is a perspective illustrating a schematic configuration of a rolling screen.

FIG. 22 is a perspective view illustrating a schematic configuration of the rolling screen 301. FIG. 23 is a sectional view taken along a line E-E' of the rolling screen 301 illustrated in FIG. 22. In the following description, the description of the parts equivalent to those of the daylighting film described above will be omitted and the same reference signs are given in the drawings.

Figure 23:
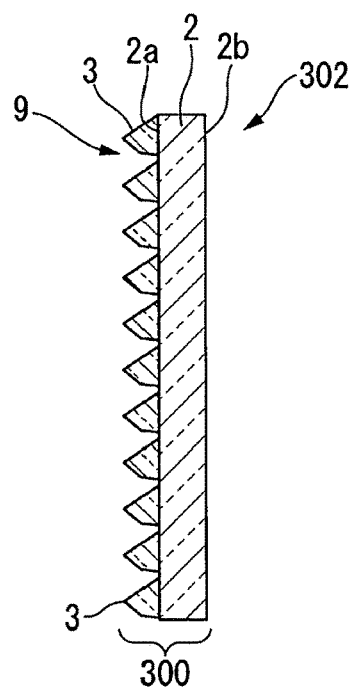
FIG. 23 is a sectional view taken along a line E-E' of the rolling screen illustrated in FIG. 22.

As illustrated in FIGS. 22 and 23, the rolling screen 301 includes a daylighting screen 302 and a winding mechanism 303 which supports the daylighting screen 302 to be freely wound up.

As illustrated in FIG. 23, the daylighting screen 302 includes a daylighting member 300 including the first base 2 that has optical transparency and has a film shape (sheet shape), the plurality of daylighting portions 3 formed to be arranged on the first surface 2a of the first base 2, and the plurality of gaps 9 each of which is formed between the plurality of daylighting portions 3, and takes external light through the daylighting member 300. The daylighting screen 302 basically has the same structure as that of the daylighting film 1. However, a thickness of the first base 2 is a thickness suitable for the rolling screen 301.

As illustrated in FIG. 22, the winding mechanism 303 includes a core (support member) 304 attached along an upper end part of the daylighting screen 302, a bottom tube (support member) 305 attached along a lower end part of the daylighting screen 302, a pulling cord 306 attached to the center of the lower end part of the daylighting screen 302, and an accommodation case 307 which accommodates the daylighting screen 302 wound around the core 304.

As a pull-cord type, the winding mechanism 303 is able to fix the daylighting screen 302 at a pulled position, or automatically wind the daylighting screen 302 around the core 304 by further pulling the pulling cord 306 from the pulled position and thereby releasing the fixation. The winding mechanism 303 is not limited to such a pull-cord type, and may be, for example, a winding mechanism of a chain type that rotates the core 304 with a chain or an automatic winding mechanism that rotates the core 304 with a motor.

The rolling screen 301 having such a configuration is used in a state where the accommodation case 307 is fixed to the upper part of the window glass 308 and the daylighting screen 302 accommodated in the accommodation case 307 opposes the inner surface of the window glass 308 while pulling the daylighting screen 302 with the pulling cord 306. At this time, the daylighting screen 302 is disposed in a direction in which an arrangement direction of the plurality of daylighting portions 3 with respect to the window glass 308 coincides with a vertical direction (perpendicular direction) of the window glass 308. That is, the daylighting screen 302 is disposed so that the longitudinal direction of the plurality of daylighting portions 3 with respect to the window glass 308 coincides with a transverse direction (horizontal direction) of the window glass 308.

The daylighting screen 302 opposing the inner surface of the window glass 308 directs the light, which has entered the room through the window glass 308, toward the ceiling of the room, while changing a direction of the light with the plurality of daylighting portions 3. The light being directed to the ceiling is reflected by the ceiling and illuminates the inside of the room, and thus the light is used instead of illumination light. Accordingly, in a case where such a rolling screen 301 is used, it is possible to expect an energy saving effect of saving energy consumed by lighting equipment in a building in the daytime.

As described above, in a case where the rolling screen 301 of the present embodiment is used, it is possible to efficiently guide outdoor natural light (sunlight) into the room, cause a person in the room to feel that the deep inside of the room is bright, without being dazzled, and prevent fluctuation of an illumination position accompanied with the altitude change of the sun.

Although not illustrated, as the rolling screen according to the present embodiment of the invention, in addition to the configuration of the rolling screen 301, a functional film such as a light diffusion film for diffusing light in a direction toward the glare region G or a heat insulation film having optical transparency for insulating radiant heat of natural light (sunlight) may be disposed on the second surface 2b side of the first base 2, for example.

Seventh Embodiment (Blind)

Next, a blind (daylighting device) 401 illustrated in FIG. 24 will be described as a seventh embodiment of the invention, for example.

Figure 24:
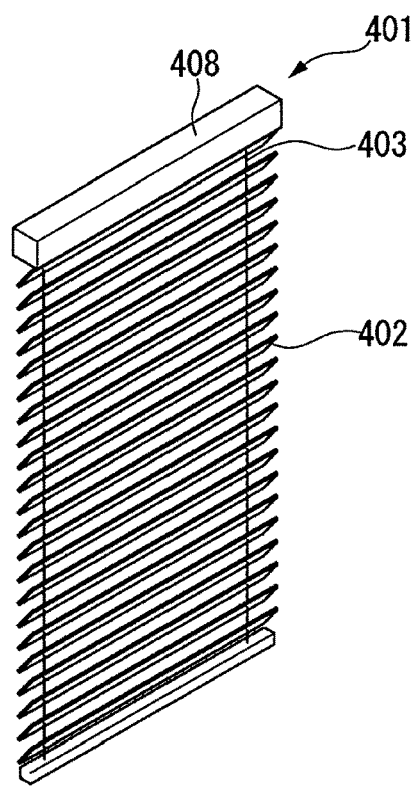
FIG. 24 is a perspective illustrating a schematic configuration of a blind.
Figure 25A:
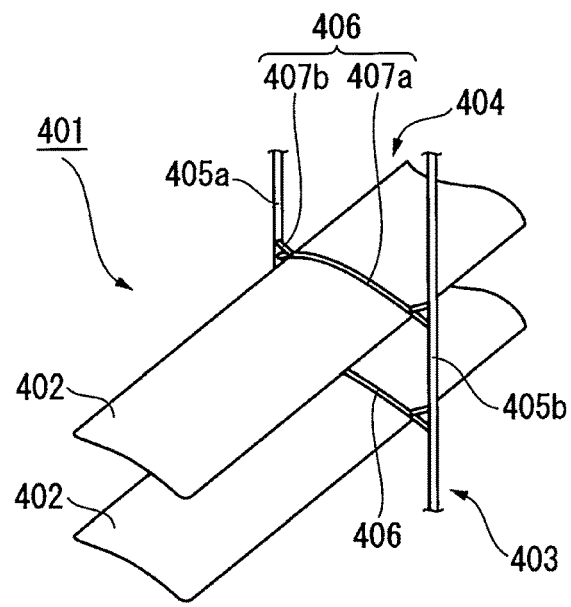
FIG. 25A is a first perspective view illustrating a schematic configuration of the blind.
Figure 25B:
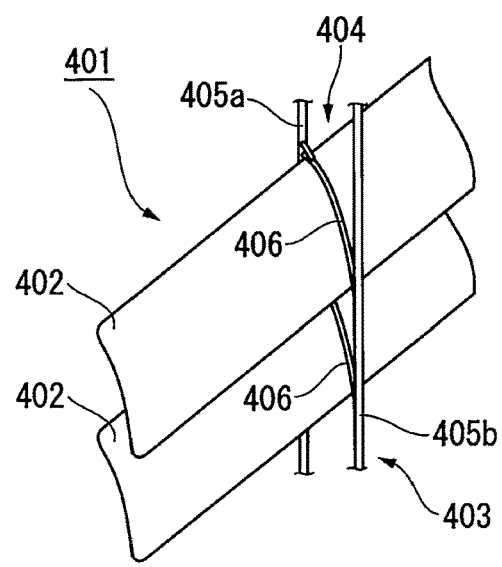
FIG. 25B is a second perspective view illustrating a schematic configuration of the blind.

FIG. 24 is a perspective view illustrating a schematic configuration of a blind. FIGS. 25A and 25B are perspective views each illustrating a schematic configuration of the blind 401. FIG. 25A illustrates an opened state of the blind 401 and FIG. 25B illustrates a closed state of the blind 401. FIGS. 25A and 25B each illustrates a schematic configuration of a plurality of daylighting slats 402.

In the following description, the description of similar parts to those of the daylighting film 1 will be omitted and the same reference signs are given in the drawings.

As illustrated in FIG. 24, the blind 401 includes the plurality of daylighting slats 402 disposed to be arranged at predetermined intervals, a tilting mechanism (support mechanism) 403 which supports the plurality of daylighting slats 402 to be freely tilted, and an accommodation mechanism 408 which folds and accommodates the plurality of daylighting slats 402 linked with the tilting mechanism (support mechanism) 403 so as to be able to be taken in and out.

Figure 26:
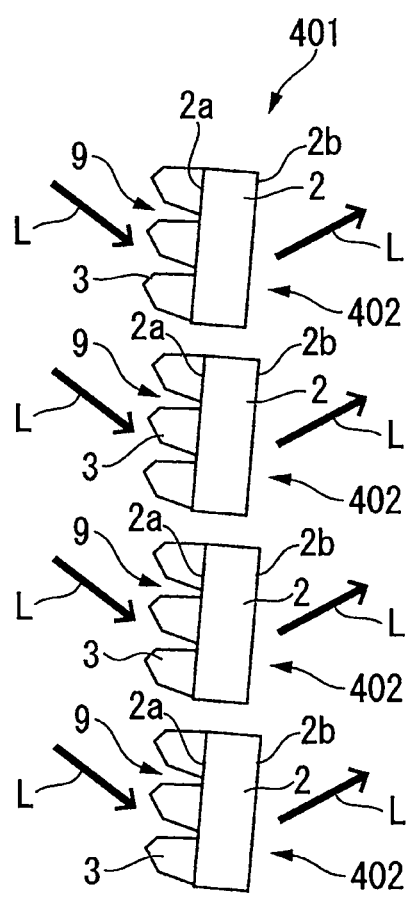
FIG. 26 is a sectional view illustrating a schematic configuration of daylighting slats included in the blind.

As illustrated in FIGS. 25A, 25B, and 26, each of the plurality of daylighting slats 402 is a daylighting member including the first base 2 that has optical transparency and has an elongated plate shape, the plurality of daylighting portions 3 formed to be arranged on the first surface 2a of the first base 2, and the plurality of gaps 9 each of which is formed between the plurality of daylighting portions 3. Each of the daylighting slats 402 basically has the same structure as that of the daylighting film 1.

However, the shape of the first base 2 is different from that of the daylighting film or the daylighting screen of each of the embodiments described above.

The tilting mechanism 403 includes a plurality of ladder cords 404. Although not illustrated, the plurality of ladder cords 404 are arranged in a longitudinal direction of the daylighting slats 402 to thereby support the plurality of daylighting slats 402. Specifically, the ladder cords 404 include a pair of vertical cords 405a and 405b arranged in parallel to each other, and a plurality of horizontal cords 406 each of which is stretched between the vertical cords 405a and 405b and which are arranged at equivalent intervals in the longitudinal direction of the vertical cords 405a and 405b. In the ladder cord 404, the daylighting slat 402 is held between the vertical cords 405a and 405b while the daylighting slat 402 is interposed with a pair of holding cords 407a and 407b constituting the horizontal cord 406.

Although not illustrated, the tilting mechanism 403 includes an operation mechanism that moves the pair of vertical cords 405a and 405b in a vertical direction to be reverse to each other. In the tilting mechanism 403, it is possible to tilt the plurality of daylighting slats 402 while synchronizing the daylighting slats 402 with each other, with the movement operation of the pair of vertical cords 405a and 405b performed by the operation mechanism.

The blind 401 having the configuration as described above is used in a state of being suspended from an upper part of a window glass (not illustrated) and opposing an inner surface of the window glass. At that time, each of the daylighting slats 402 is disposed in a direction in which the arrangement direction of the plurality of daylighting portions 3 with respect to the window glass coincides with the vertical direction (perpendicular direction) of the window glass. In other words, the daylighting slat 402 is disposed so that an extending direction of the plurality of daylighting portions 3 with respect to the window glass coincides with a transverse direction (horizontal direction) of the window glass.

As illustrated in FIG. 26, the blind 401 opposing the inner surface of the window glass directs the light L, which has entered the room through the window glass, toward the ceiling of the room, while changing a direction of the light with the plurality of daylighting portions 3. The light L being directed to the ceiling is reflected by the ceiling and illuminates the room, and thus the light is used instead of illumination light. Accordingly, in a case where such a blind 401 is used, it is possible to expect an energy saving effect of saving energy consumed by lighting equipment in a building in the daytime.

In the blind 401, it is possible to adjust an angle of the light L being directed to the ceiling by tilting the plurality of daylighting slats 402. In addition, it is possible to adjust the light incident from between the plurality of daylighting slats 402.

Figure 27:
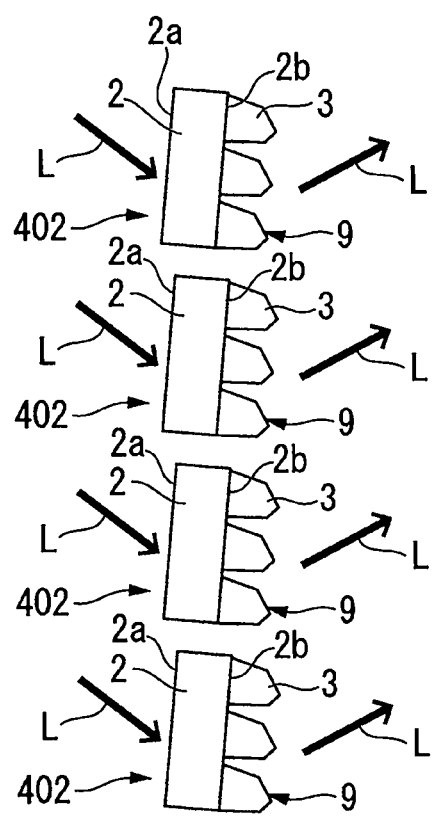
FIG. 27 is a sectional view illustrating a state where orientations of the daylighting slats included in the blind are reversed.

As illustrated in FIG. 27, in the blind 401, even in a case where the direction of the daylighting slats 402 is inverted by 180°, it is possible to direct the light L, which has entered the room through the window glass, toward the ceiling of the room, while changing a direction of the light with the plurality of daylighting portions 3, in a similar manner to the case before inverting the direction of the daylighting slats 402.

Figure 28:
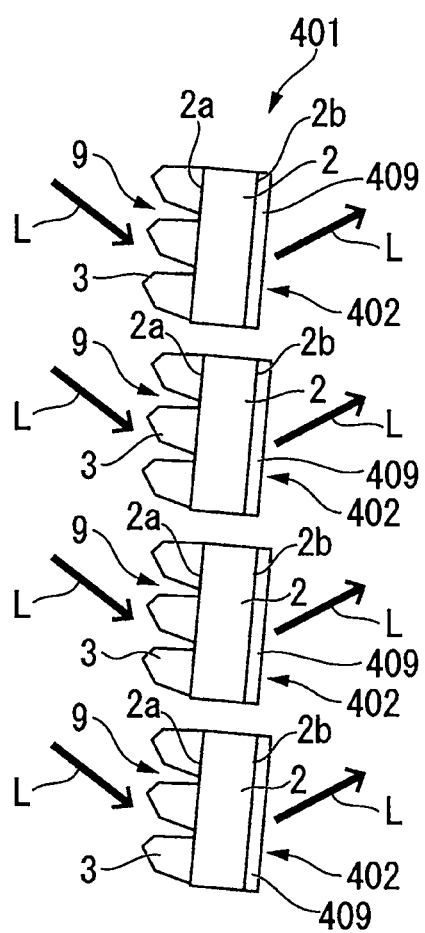
FIG. 28 is a sectional view illustrating a modified example of the daylighting slats.
Figure 29:
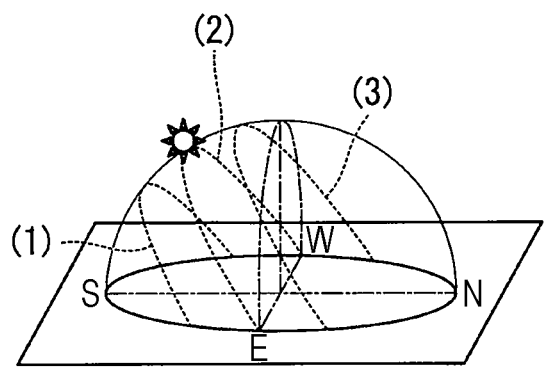
FIG. 29 illustrates the sky as a half sphere in Tokyo (latitude 35° north) in a middle latitude region.
Figure 30:
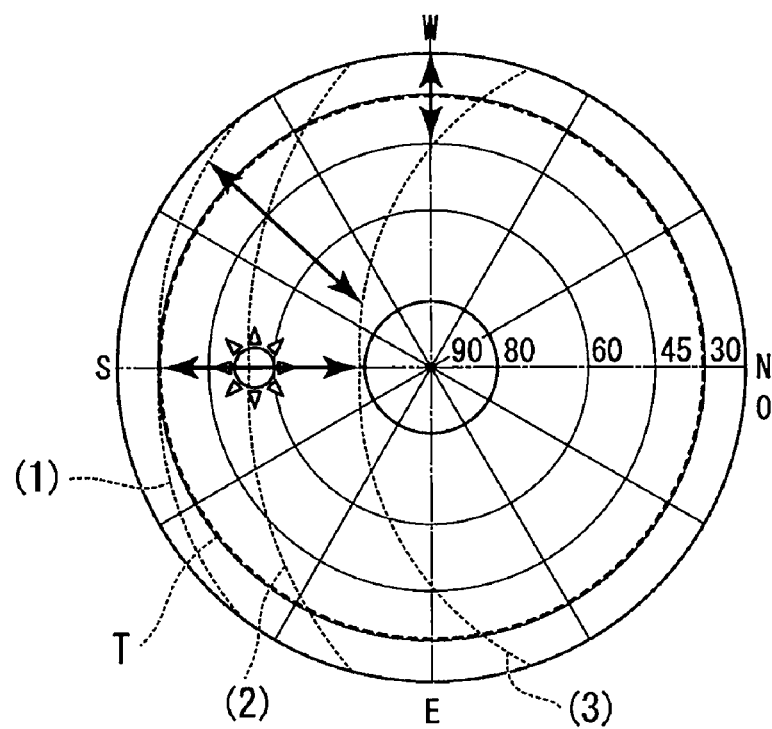
FIG. 30 is a plan view of the half sphere of FIG. 29 when viewed from the zenith.
Figure 31A:
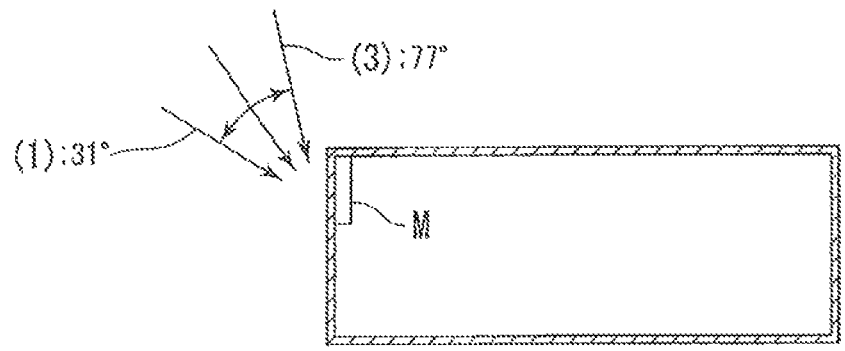
FIG. 31A illustrates a range in which the altitude of the sun on a front side annually changes when a direction of a window surface is the south.
Figure 31B:
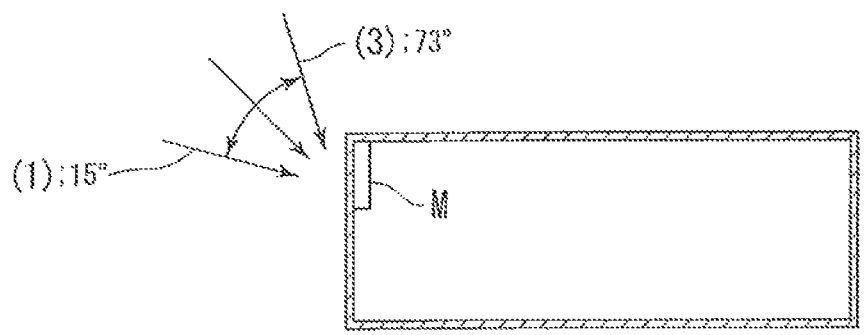
FIG. 31B illustrates a range in which the altitude of the sun on the front side annually changes when the direction of the window surface is the southwest.
Figure 31C:
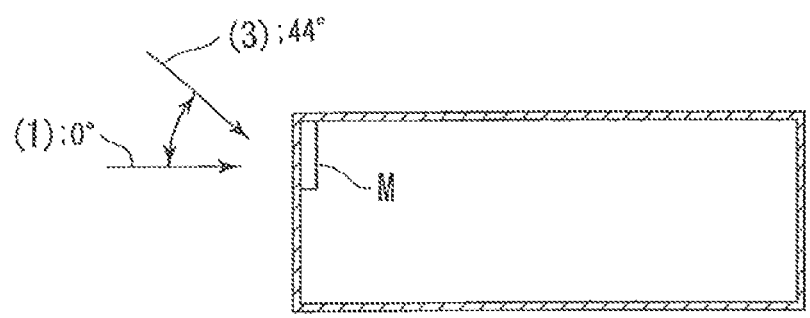
FIG. 31C illustrates a range in which the altitude of the sun on the front side annually changes when the direction of the window surface is the west.
Figure 32A:
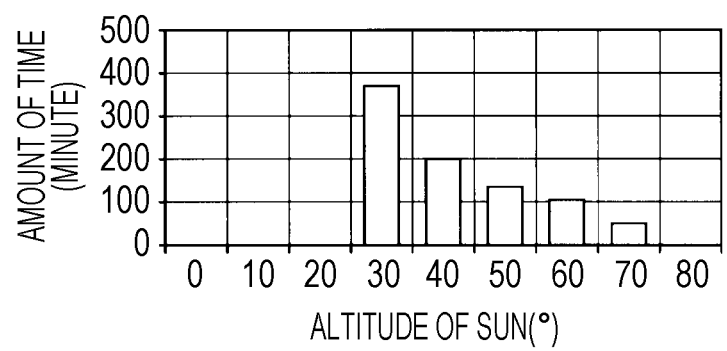
FIG. 32A is a graph of an amount of time relative to the altitude of the sun when the direction is the south.
Figure 32B:
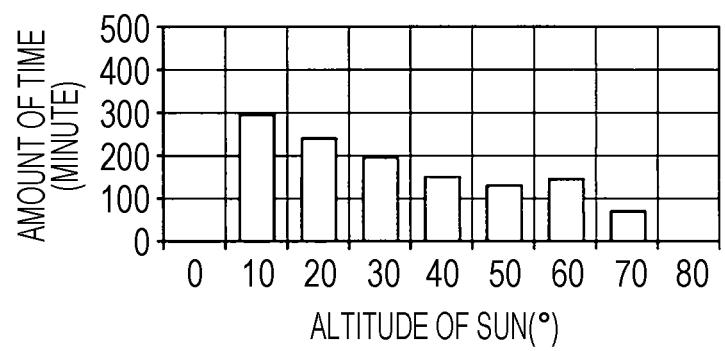
FIG. 32B is a graph of an amount of time relative to the altitude of the sun when the direction is the southwest.
Figure 32C:
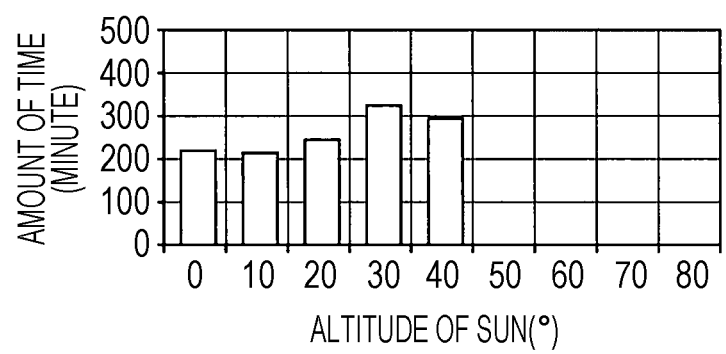
FIG. 32C is a graph of an amount of time relative to the altitude of the sun when the direction is the west.
Figure 33:
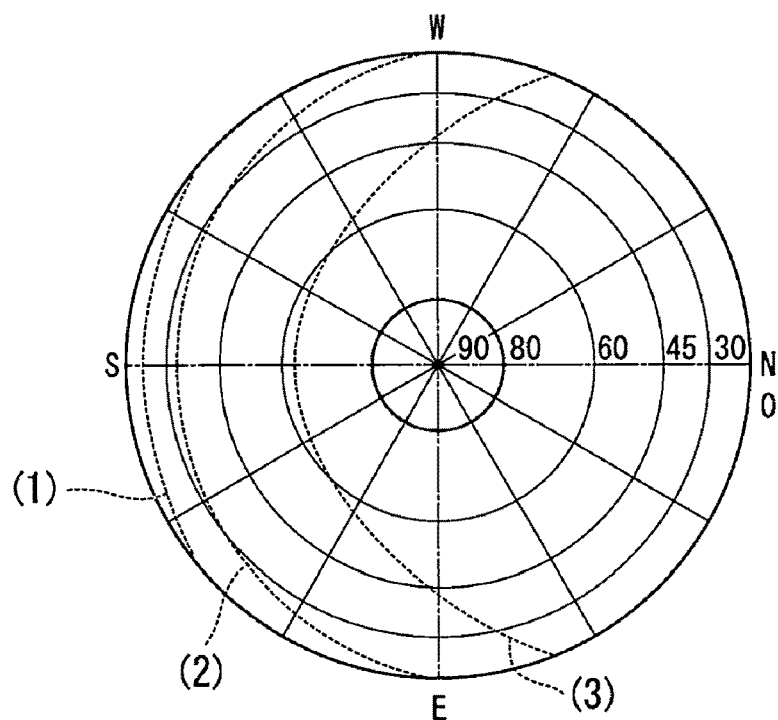
FIG. 33 illustrates a trajectory of the sun in Paris and London (latitude 50° north) in a high latitude region (a plan view when viewed from the zenith).
Figure 34:
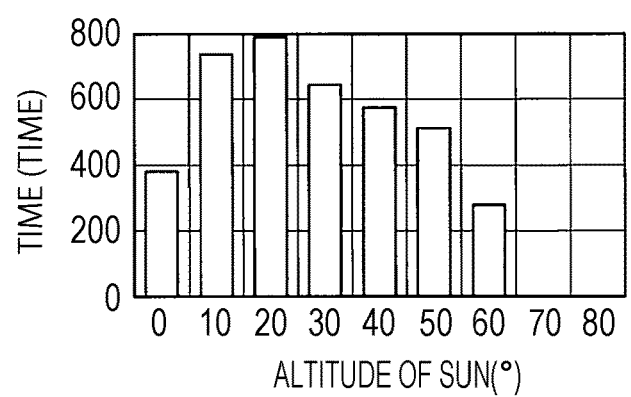
FIG. 34 is a graph illustrating time distribution of the altitude of the sun.
Figure 35A:
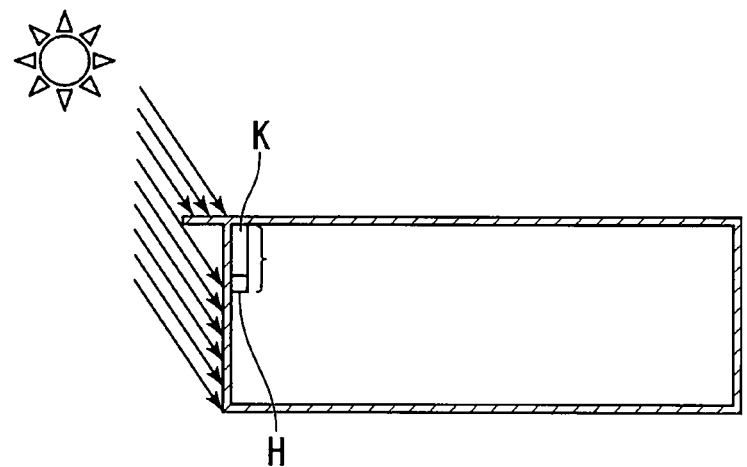
FIG. 35A illustrates rays of light illuminating a window surface of a building with eaves, and illustrates a case where the altitude of the sun is high.
Figure 35B:
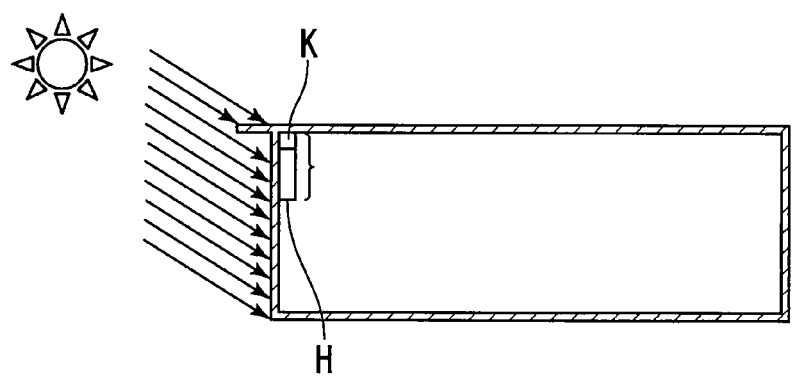
FIG. 35B illustrates rays of light illuminating a window surface of a building with eaves, and illustrates a case where the altitude of the sun is low.

As illustrated in FIG. 28, a slat member 409 having an elongated plate shape may be separately provided on the second surface 2b side of the first base 2 having an elongated plate shape. In this case, it is desirable that refractive indexes of the first base 2 and the slat member 409 are approximately equivalent to each other.

As described above, in a case where the blind 401 of the present embodiment is used, it is possible to efficiently guide outdoor natural light (sunlight) into the room, cause a person in the room to feel that the deep inside of the room is bright, without being dazzled, and prevent fluctuation of an illumination position accompanied with the altitude change of the sun.

Note that, the invention is not necessarily limited to the configuration of the blind 401 of the seventh embodiment and various modifications may be added within a range not departing from the gist of the invention.

For example, although not illustrated, as the blind according to the present embodiment of the invention, in addition to the configuration of the blind 401, a functional film (functional member) such as a light diffusion film (light diffusion member) for diffusing light in a direction toward the glare region G or a heat insulation film (heat insulation member) having optical transparency for insulating radiant heat of natural light (sunlight) may be disposed on the second surface 2b side of the first base 2, for example.

Moreover, as the blind according to the embodiment of the invention, a combination of the daylighting slat 402 and a light shielding slat having light shielding properties may be used. In this case, the blind is configured to include a daylighting portion constituted by the plurality of daylighting slats 402, and a light shielding portion which is positioned on a lower part of the daylighting portion and constituted by a plurality of light shielding slats. With such a configuration, it is possible to illuminate the light, which has entered the room through the window glass, toward the ceiling in the room by using the plurality of daylighting slats 402 constituting the daylighting portion and shield light being directed to the glare region by using the plurality of light shielding slats constituting the light shielding portion.

[Lighting Control System]

Figure 36:
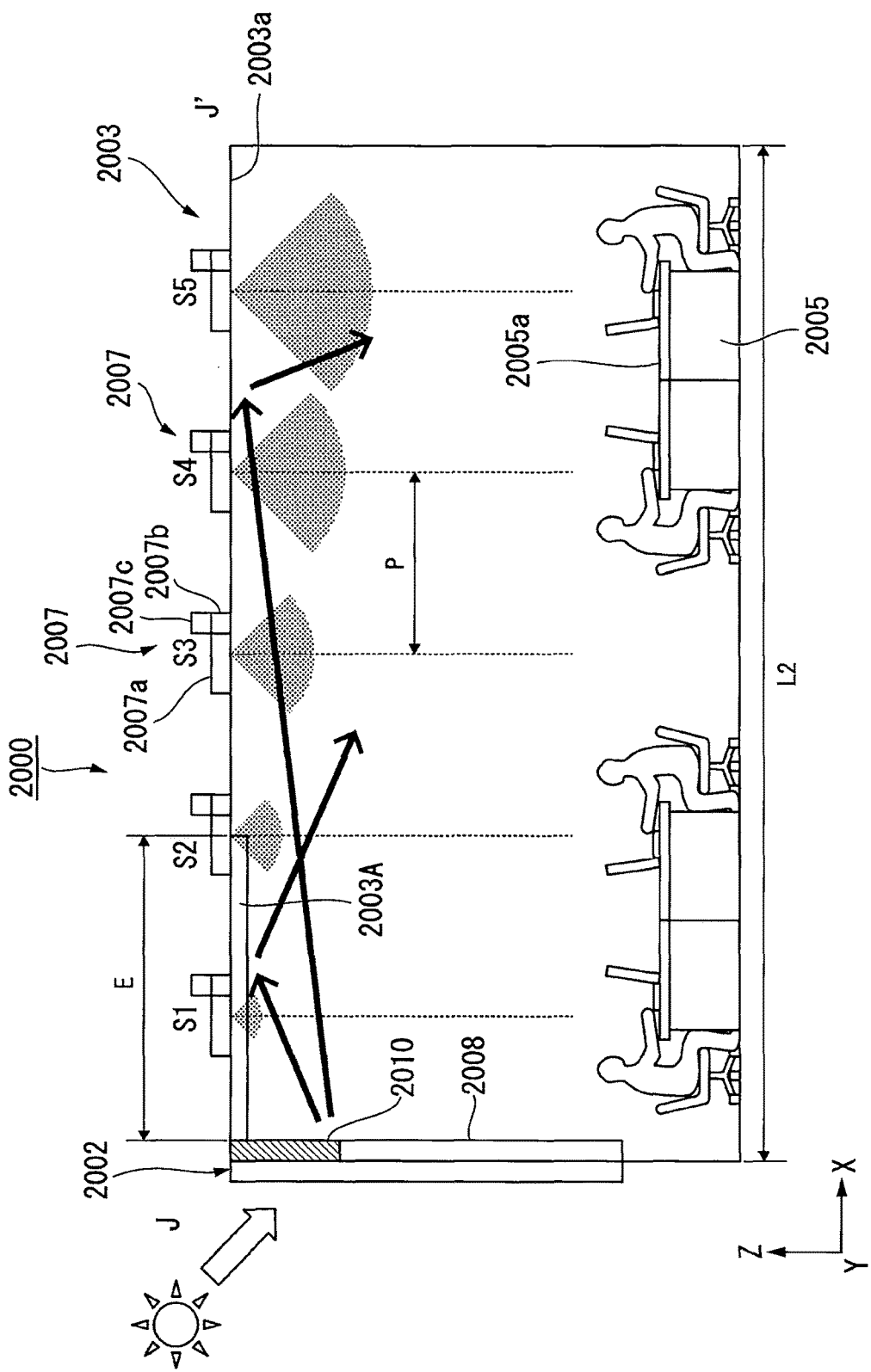
FIG. 36 illustrates a room model including a daylighting device and a lighting control system and is a sectional view taken along a line J-J' of FIG. 37.
Figure 37:
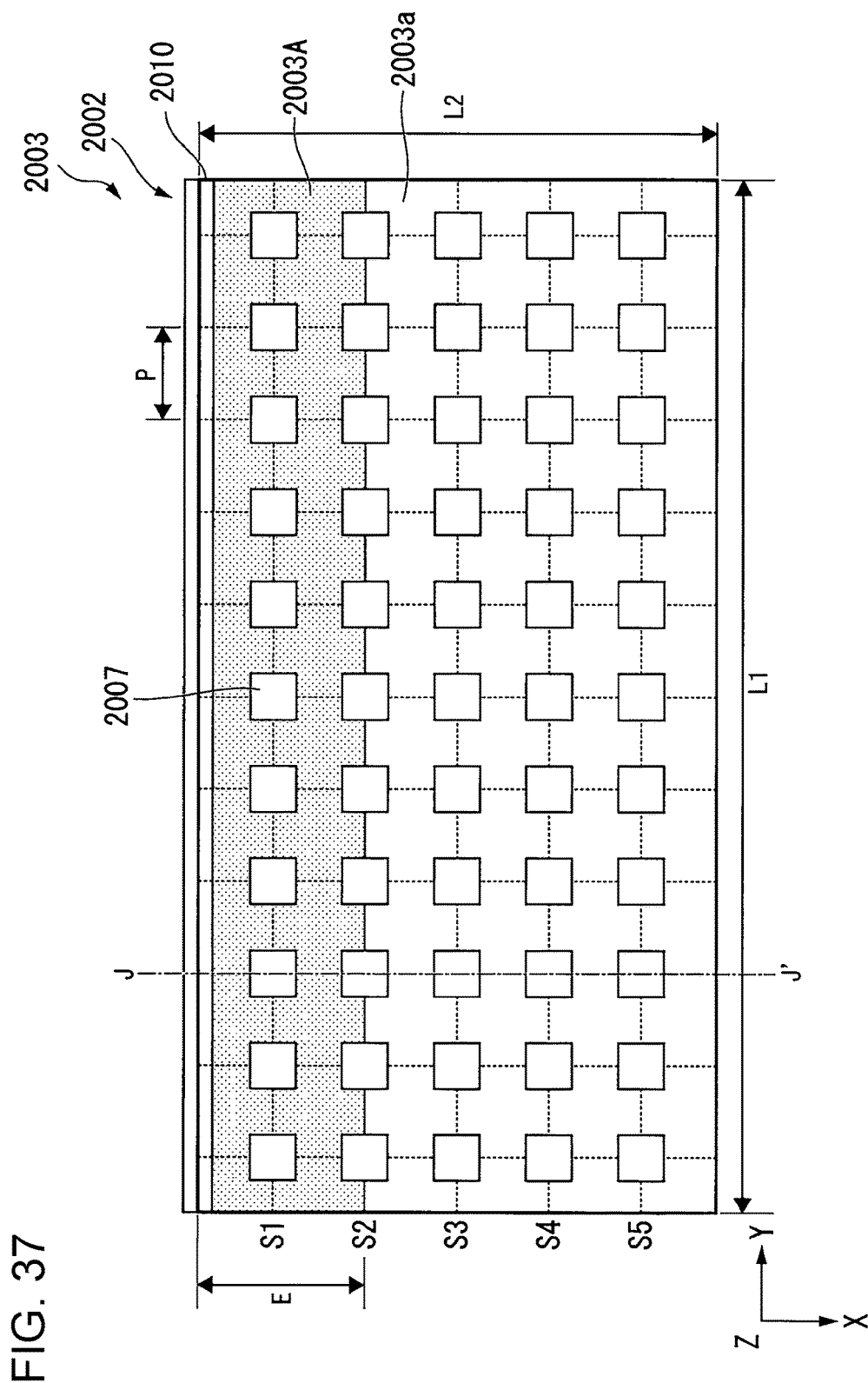
FIG. 37 is a plan view illustrating a ceiling of the room model.

FIG. 36 illustrates a room model 2000 including a daylighting device and a lighting control system and is a sectional view taken along a line J-J' of FIG. 37. FIG. 37 is a plan view illustrating a ceiling of the room model 2000.

In the room model 2000, a ceiling material constituting a ceiling 2003a of a room 2003 into which external light is guided may have high light reflectivity. As illustrated in FIGS. 36 and 37, a light-reflective ceiling material 2003A is installed on the ceiling 2003a of the room 2003 as a ceiling material having light reflectivity. The light-reflective ceiling material 2003A is used for the purpose of promoting the guiding of external light from a daylighting device 2010 installed on a window 2002 into deep inside the room, and therefore installed on the ceiling 2003a on a window side. Specifically, the light-reflective ceiling material 2003A is installed in a predetermined region E (a region within about 3 m from the window 2002) of the ceiling 2003a.

As described above, the light-reflective ceiling material 2003A functions to efficiently guide, to deep inside the room, external light which is guided into the room through the window 2002 on which the daylighting device 2010 (the daylighting device of any embodiment described above) is installed. The external light guided to the ceiling 2003a in the room from the daylighting device 2010 is reflected by the light-reflective ceiling material 2003A and a direction of the light is changed to illuminate a desk top surface 2005a of a desk 2005 which is placed in the deep inside of the room, and thus an effect of making the desk top surface 2005a bright is exhibited.

The light-reflective ceiling material 2003A may have diffusion reflectivity or may have specular reflectivity, but preferably has both properties mixed appropriately in order to achieve both the effect of making the desk top surface 2005a of the desk 2005 placed in the deep inside of the room bright and the effect of suppressing glare light uncomfortable for a person in the room.

Though most of the light guided into the room by the daylighting device 2010 is directed to the ceiling near the window 2002, an amount of light is sufficient near the window 2002 in many cases. Thus, the light-reflective ceiling material 2003A as described above is used in combination, and thereby it is possible to allocate the light incident on the ceiling (region E) near the window to the deep inside of the room where an amount of light is less than that near the window side.

The light-reflective ceiling material 2003A is able to be created, for example, by embossing a metal plate made of aluminum or the like with unevenness of about several tens of microns or by applying vapor deposition of a metal thin film made of aluminum or the like to a surface of a resin base on which similar unevenness is formed. Alternatively, unevenness may be formed by embossing a curved surface with longer intervals.

Further, by appropriately changing an embossing shape to be formed on the light-reflective ceiling material 2003A, it is possible to control light distribution characteristics of light and distribution of light in the room. For example, when the embossment is performed in a stripe shape extending to the deep inside of the room, the light reflected by the light-reflective ceiling material 2003A expands in a right-and-left direction (a direction intersecting a longitudinal direction of unevenness) of the window 2002. When a size and a direction of the window 2002 of the room 2003 are limited, by using such a property, it is possible to diffuse the tight in a horizontal direction and reflect the light toward the deep inside of the room by the light-reflective ceiling material 2003A.

The daylighting device 2010 is used as a part of a lighting control system of the room 2003. The lighting control system is constituted by components of the entire room, for example, including the daylighting device 2010, a plurality of indoor lighting devices 2007, a solar radiation adjustment device 2008 installed on the window, a control system for those components, and the light-reflective ceiling material 2003A installed on the ceiling 2003a.

The window 2002 of the room 2003 has the daylighting device 2010 installed on an upper side thereof and has the solar radiation adjustment device 2008 installed on a lower side thereof. Here, a blind is installed as the solar radiation adjustment device 2008, but there is no limitation thereto.

In the room 2003, the plurality of indoor lighting devices 2007 are arranged in a lattice manner in the right-and-left direction (Y-direction) of the window 2002 and in a depth direction (X-direction) of the room. The plurality of indoor lighting devices 2007 constitute the entire lighting system of the room 2003 along with the daylighting device 2010.

As illustrated in FIGS. 36 and 37, for example, the ceiling 2003a of an office in which a length L1 of the window 2002 in the right-and-left direction (Y-direction) is 18 m and a length L2 of the room 2003 in the depth direction (X-direction) is 9 m is illustrated. Here, the indoor lighting devices 2007 are arranged in a lattice manner at each interval P of 1.8 m in a transverse direction (Y-direction) and a depth direction (X-direction) of the ceiling 2003a.

More specifically, fifty indoor lighting devices 2007 are arrayed with 10 rows (Y-direction)×5 columns (X-direction).

Each of the indoor lighting devices 2007 includes indoor lighting equipment 2007a, a brightness detection portion 2007b, and a control portion 2007c, and is formed with the brightness detection portion 2007b and the control portion 2007c integrated with the indoor lighting equipment 2007a.

The indoor lighting devices 2007 may include a plurality of pieces of indoor lighting equipment 2007a and a plurality of brightness detection portions 2007b. However, one brightness detection portion 2007b is provided for each piece of indoor lighting equipment 2007a. The brightness detection portion 2007b receives light reflected by a surface to be illuminated by the indoor lighting equipment 2007a and detects illuminance of the illuminated surface. Here, the illuminance on the desk top surface 2005a of the desk 2005 placed in the room is detected by the brightness detection portion 2007b.

The control portions 2007c each of which is provided in each of the indoor lighting devices 2007 are connected to each other. Each of the indoor lighting devices 2007 performs feedback control, by the control portions 2007c connected to each other, to adjust a light output of an LED lamp of each indoor lighting equipment 2007a so that the illuminance on the desk top surface 2005a that is detected by each brightness detection portion 2007b is a certain target illuminance L0 (for example, average illuminance: 750 lx).

Figure 38:
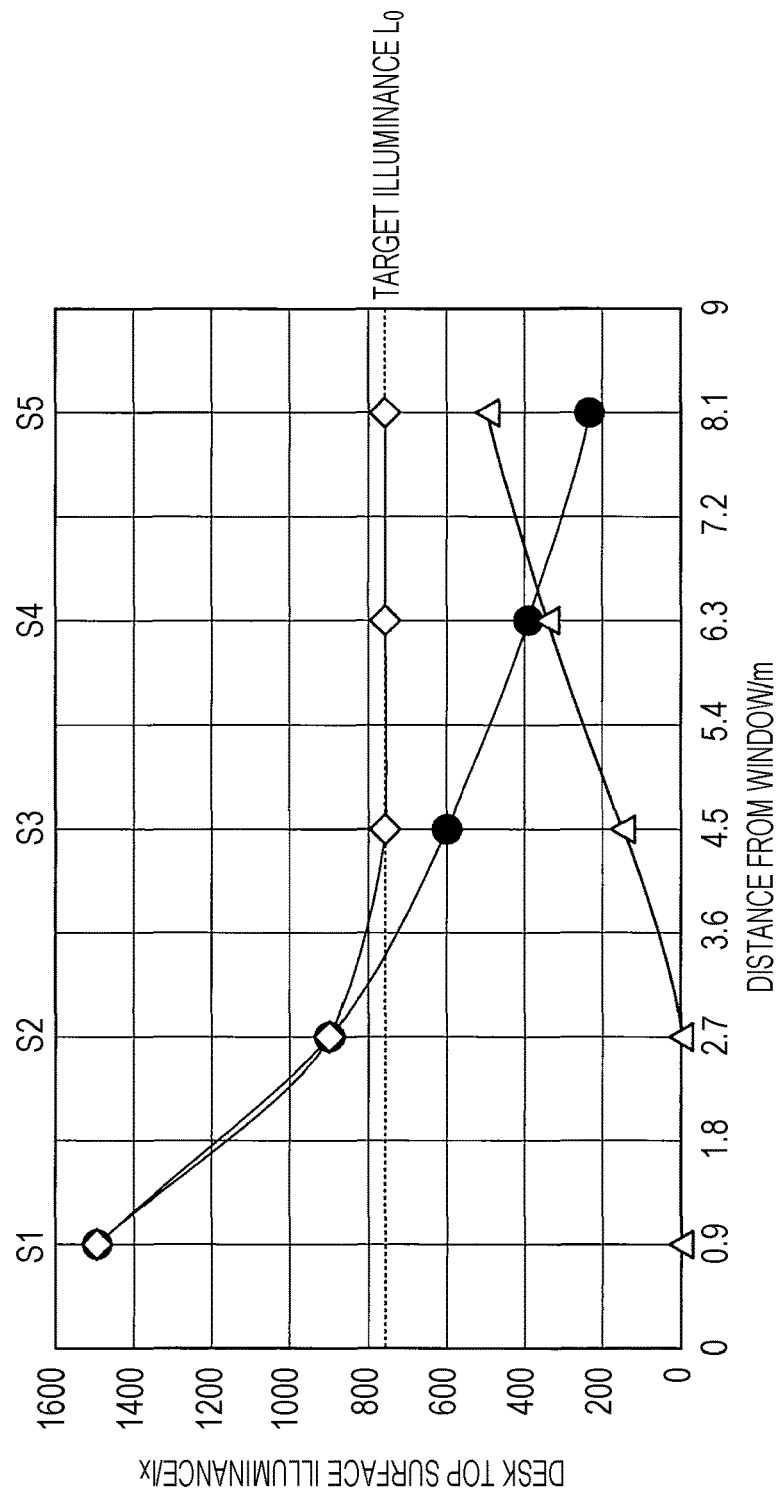
FIG. 38 is a graph illustrating a relationship between illuminance of light (natural light) that is guided into a room by the daylighting device and illuminance (lighting control system) that is provided by indoor lighting devices.

FIG. 38 is a graph illustrating a relationship between illuminance of light (natural light) that is guided into the room by the daylighting device and illuminance (lighting control system) that is provided by the indoor lighting devices. In FIG. 38, a vertical axis indicates illuminance (lx) on the desk top surface, and a horizontal axis indicates a distance (m) from the window. Furthermore, a dashed line in the figure indicates indoor target illuminance. (●: illuminance provided by the daylighting device, Δ: illuminance provided by the indoor lighting devices, and ◊: total illuminance)

As illustrated in FIG. 38, the closer the desk is to the window, the more the illuminance on the desk top surface that results from the light that is taken by the daylighting device 2010 increases, and the more distant the desk is from the window, the more an effect thereof decreases. In the room to which the daylighting device 2010 is applied, such distribution of illuminance in a deep inside direction of the room occurs with natural daylighting from the window in the daytime. Then, the daylighting device 2010 is used together with the indoor lighting devices 2007 that compensate for the indoor illuminance distribution. The indoor lighting devices 2007 installed on the ceiling inside the room lights under such lighting control that average illuminances below the devices are detected by the brightness detection portions 2007b, and the desk top surface illuminance of the entire room becomes a certain target illuminance L0.

Thus, columns S1 and S2 installed in the vicinity of the window hardly light, and columns S3, S4, and S5 light with higher outputs toward the deep inside direction of the room. As a result, the desk top surface of the room is illuminated by a total of the illuminance attributed to natural daylighting and the illuminance attributed to the indoor lighting devices 2007, and thus a desk top surface illuminance of 750 lx (recommended maintenance illuminance in office, "JIS Z9110 General rules of recommended lighting levels"), which is considered to be sufficient for work across the entire room, is able to be achieved.

As described above, by using the daylighting device 2010 and the lighting control system (indoor lighting devices 2007) together, it is possible to deliver the light to the deep inside of the room, thus making it possible to further increase the brightness of the inside of the room and ensure a desk top surface illuminance considered to be sufficient for work across the entire room. Accordingly, it is possible to obtain a more stable bright light environment regardless of seasons or weathers.

While preferred embodiments according to the invention have been described above with reference to the accompanying drawings, needless to say, the invention is not limited to such examples. It is apparent that a person skilled in the art could conceive of various modifications and alterations within the range of the technical ideas that are described in claims, and of course, such modifications and alterations are understood as falling within the technical scope of the invention.

INDUSTRIAL APPLICABILITY

Some aspects of the invention are able to be applied to a daylighting member, a daylighting device, an installation method for the daylighting member, and the like that need to suppress glare.

REFERENCE SIGNS LIST 1, 12, 22, 32, 42, 52, 62 daylighting film (daylighting member), 2 first base, 2a first surface, 2b second surface, 3, 13, 23, 33 daylighting portion (polygonal prism structure), 3F, 7A first side, 3A, 7B second side, 3C, 7C third side (second side), 3D fourth side (third side), 3B fifth side, 3E sixth side, 7 auxiliary daylighting portion, 8 window glass (transparent structure), 9 gap, L, L1, L2 light, L, L1, L2 length, q1 first vertex, q2 second vertex, q3 third vertex, q4 fourth vertex, q5 fifth vertex, q6 sixth vertex, 300 daylighting member, 301 rolling screen (daylighting device), 303 winding mechanism, 304 core (support member), 305 bottom tube (support member), 401 blind (daylighting device), 408 accommodation mechanism, 2007 indoor lighting device, 2010 daylighting device

The invention claimed is:
1. A daylighting member, comprising:
a first base having optical transparency;
a plurality of daylighting portions constituted by a plurality of polygonal prism structures that have optical transparency and are provided on a first surface of the first base, and
gaps provided between the plurality of daylighting portions, wherein
each of the polygonal prism structures is a polygon that has five or more vertexes in a sectional shape orthogonal to a longitudinal direction of the polygonal prism structure and has all interior angles less than 180°,
the polygon has a first side that is a side of the polygon corresponding to a surface in contact with the first base of the polygonal prism structure, and a plurality of vertexes including a first vertex and a second vertex that are vertexes corresponding to both ends of the first side, and a third vertex that is not positioned on the first side,
a length of a line perpendicular to the first side passing the third vertex is longer than lengths of lines perpendicular to the first side passing vertexes other than the third vertex among the plurality of vertexes,
a shape of the polygon is asymmetrical with the line perpendicular to the first side passing the third vertex as a center,
an angle a formed by a side opposite a fourth vertex with respect to the line perpendicular to the first side passing the third vertex, and the first surface of the base satisfies a range of a formula (1):

[Math. 1]

$$n \times \sin\{a - a'\} \geq \sin 45 \quad (1)$$
$$a' = \sin^{-1}\left(\frac{1}{n} \times \sin a\right)$$

an angle c formed by a side between the third vertex and the fourth vertex and the first surface of the base satisfies a range of a formula (2):

[Math. 2]

$$c \geq \theta_{nc} \quad (2)$$

and an angle d formed by a side closer to the second vertex than the fourth vertex and the first surface of the base satisfies a range of a formula (3):

[Math. 3]

$$d > \frac{1}{2}(a' - a + 180) \quad (3)$$
$$a' = \sin^{-1}\left(\frac{1}{n} \times \sin a\right)$$

where among vertexes positioned on the same side as the second vertex with respect to the line perpendicular to the first side passing the third vertex, a vertex closest to the third vertex is the fourth vertex, n represents a refractive index of the first base and the polygonal prism structure, and θnc represents a critical angle at an interface between a medium having a refractive index of n and a medium having a refractive index of 1.0, and
wherein a fifth vertex exists as a vertex closest to the first vertex among vertexes positioned on the same side as the first vertex with respect to the line perpendicular to the first side passing the third vertex.
2. The daylighting member according to claim 1, wherein an angle formed by a surface between the third vertex and the fifth vertex and the first surface of the base and 90°, and a length of a line perpendicular to the first side passing the fifth vertex is shorter than a length of a line perpendicular to the first side passing the fourth vertex.
3. The daylighting member according to claim 1, wherein a sixth vertex exists as a vertex closest to the second vertex among vertexes positioned between the fourth vertex and the second vertex, and an angle formed by a side between the sixth vertex and the second vertex and the first surface of the base is between an angle formed by a side between the fourth vertex and the sixth vertex and the first surface of the base and 90°.
4. The daylighting member according to claim 1, wherein the polygon is a hexagon,
the fifth vertex and a sixth vertex coexist,
the fifth vertex exists as a vertex closest to the first vertex among vertexes positioned on the same side as the first vertex with respect to the line perpendicular to the first side passing the third vertex,
an angle formed by a side between the fifth vertex and the first vertex and the first surface of the base is between an angle formed by a surface between the third vertex and the fifth vertex and the first surface of the base and 90°,
a length of a line perpendicular to the first side passing the fifth vertex is shorter than a length of a line perpendicular to the first side passing the fourth vertex, the sixth vertex exists as a vertex closest to the second vertex among vertexes existing between the fourth vertex and the second vertex, and an angle formed by a side between the sixth vertex and the second vertex and the first surface of the base is between an angle formed by a side between the fourth vertex and the sixth vertex and the first surface of the base and 90°.

5. A daylighting device, comprising:

the daylighting member according to claim 1; and a support member that supports the daylighting member, wherein external light is taken through the daylighting member.

6. The daylighting device according to claim 5, further comprising an accommodation mechanism that folds and accommodates the support member, which supports the daylighting member, the support member being able to be taken in the accommodation mechanism and taken out from the accommodation mechanism.

7. The daylighting device according to claim 5, further comprising a winding mechanism that winds up the support member, which supports the daylighting member, the support member being able to be taken in the winding mechanism and taken out from the winding mechanism.

8. An installation method for a daylighting member, the method comprising:

arranging a plurality of daylighting portions so that a side of a polygon where an area with respect to a line perpendicular to a first side passing a third vertex is large faces downward in a vertical direction; and installing the daylighting member in a transparent structure, wherein the daylighting member includes a first base having optical transparency;

the plurality of daylighting portions constituted by a plurality of polygonal prism structures that have optical transparency and are provided on a first surface of the first base, and gaps provided between the plurality of daylighting portions, in which each of the polygonal prism structures is a polygon that has five or more vertexes in a sectional shape orthogonal to a longitudinal direction of the polygonal prism structure and has all interior angles less than 180°, the polygon has the first side that is a side of the polygon corresponding to a surface in contact with the first base of the polygonal prism structure, and a plurality of vertexes including a first vertex and a second vertex that are vertexes corresponding to both ends of the first side, and the third vertex that is not positioned on the first side, a length of the line perpendicular to the first side passing the third vertex is longer than lengths of lines perpendicular to the first side passing vertexes other than the third vertex among the plurality of vertexes, a shape of the polygon is asymmetrical with the line perpendicular to the first side passing the third vertex as a center, an angle formed by a side opposite a fourth vertex with respect to the line perpendicular to the first side passing the third vertex, and the first surface of the base satisfies a range of a formula (4):

[Math. 4]

$$n \times \sin\{a - a'\} \geq \sin 45 \qquad (4)$$
$$a' = \sin^{-1}\left(\frac{1}{n} \times \sin a\right)$$

an angle formed by a side between the third vertex and the fourth vertex and the first surface of the base satisfies a range of a formula (5):

[Math. 5]

$$c \geq \theta_{nc} \qquad (5)$$

and angle formed by a side closer to the second vertex than the fourth vertex and the first surface of the base satisfies a range of a formula (6):

[Math. 6]

$$d > \frac{1}{2}(a' - a + 180) \qquad (6)$$
$$a' = \sin^{-1}\left(\frac{1}{n} \times \sin a\right)$$

where among vertexes positioned on the same side as the second vertex with respect to the line perpendicular to the first side passing the third vertex, a vertex closest to the third vertex is the fourth vertex, n represents a refractive index of the first base and the polygonal prism structure, and θnc represents a critical angle at an interface between a medium having a refractive index of n and a medium having a refractive index of 1.0, and where a fifth vertex exists as a vertex closest to the first vertex among vertexes positioned on the same side as the first vertex with respect to the line perpendicular to the first side passing the third vertex.

\* \* \* \* \*